(12) United States Patent
Hiroi

(10) Patent No.: US 6,771,259 B2
(45) Date of Patent: *Aug. 3, 2004

(54) IMAGE GENERATING METHOD AND APPARATUS, RECORDING MEDIUM AND RANDOM NUMBER GENERATOR

(75) Inventor: Toshiyuki Hiroi, Tokyo (JP)

(73) Assignee: Sony Computer Entertainment, Inc., Tokyo (JP)

(*) Notice: Subject to any disclaimer, the term of this patent is extended or adjusted under 35 U.S.C. 154(b) by 197 days.

This patent is subject to a terminal disclaimer.

(21) Appl. No.: 10/069,000

(22) Filed: Feb. 8, 2002

(65) Prior Publication Data

US 2002/0070933 A1 Jun. 13, 2002

Related U.S. Application Data

(62) Division of application No. 08/955,218, filed on Oct. 21, 1997.

(30) Foreign Application Priority Data

Oct. 23, 1996 (JP) .......................................... P08-299478

(51) Int. Cl.[7] ............................................... G06T 15/00
(52) U.S. Cl. ....................... 345/419; 345/423; 345/531; 345/537
(58) Field of Search ................................ 345/419, 423, 345/581, 582, 537, 531; 708/250, 254, 255

(56) References Cited

U.S. PATENT DOCUMENTS 4,791,594 A   12/1988  Harney et al.
5,251,165 A   10/1993  James, III

FOREIGN PATENT DOCUMENTS

JP          4-133183       5/1992

OTHER PUBLICATIONS

Kelly et al., "Terrain Simulation Using a Model of Stream Erosion" (Computer Graphics, vol. 22, No. 4, Aug. 1988).

*Primary Examiner*—Mark Zimmerman
*Assistant Examiner*—Kimbinh T. Nguyen
(74) *Attorney, Agent, or Firm*—Fulwider Patton Lee & Utecht, LLP

(57) ABSTRACT

An image generating apparatus and method for generating drawing data on the basis of a polygon drawing command and outputting the drawing data as image data, a polygon drawing command including polygon information for drawing a reference object representing a rough shape of an object to be drawn, and an initial value given to generate quasi minute drawing information of the object is received, a reproducible random number value is generated on the basis of the initial value, an object area or a partial area of the object which is represented by the polygon information for drawing the reference object is divided into plural fundamental polygons in order to generate the quasi minute drawing information, and drawing data to draw the object on the basis of the plural fundamental polygons are generated.

12 Claims, 18 Drawing Sheets

IMAGE GENERATING METHOD AND APPARATUS, RECORDING MEDIUM AND RANDOM NUMBER GENERATOR

RELATED APPLICATIONS

This is a division of application Ser. No. 08/955,218, filed Oct. 21, 1997 which claims the benefit of Japanese patent application No. P08-299478, filed Oct. 23, 1996.

BACKGROUND OF THE INVENTION

1. Field of the Invention

The present invention relates to an image generating method, an image generating apparatus, a recording medium and a random generator used in the image generating operation which are suitably applicable to such a case that a three-dimensional object is generated and displayed on a real-time basis in a limited hardware resource such as a video game machine, a personal computer or the like.

2. Description of the Related Art

In a domestic TV game machine, a personal computer, a graphic computer or the like, an image generating apparatus for generating image data to be output to and displayed on a TV (television) image receiver, a monitor image receiver or the like is designed in combination with a general-purpose memory, a CPU and other operation LSIs which are mutually connected to the image generating apparatus through a bus. A drawing device which is specially used for only image drawing purpose is provided between the CPU and a frame buffer to increase the processing speed of image data for image drawing.

That is, according to the above-described image generating apparatus, when an image is generated, the CPU does directly access the frame buffer serving as a display memory which corresponds to the display frame, but performs geometry processing such as coordinate transformation, clipping, light-source calculation, etc. to define a three-dimensional model as a combination of basic unit figures (polygon) such as triangle, rectangle, etc. and generate a drawing command for drawing a three-dimensional image. The CPU transmits the drawing command through an external bus to the drawing device.

The drawing command contains information on the shape, position, orientation, color, pattern, etc. of a polygon to be drawn. The shape, the position and the orientation are determined by the coordinates of the apexes of the polygon.

In the image generating device as described above, when a three-dimensional object (a subject to be displayed is referred to as "object") is displayed, the object is divided into plural polygons, and the CPU generates a drawing command corresponding to each polygon and then transmits the drawing command thus generated to the drawing device through the bus. The drawing device executes the drawing command concerned and writes drawing data into the frame buffer to display the target three-dimensional object.

In the above conventional method, however, in order to finely represent various objects, it is necessary to represent each object with many small polygons in accordance with the object. Therefore, the drawing data must contain a large amount of polygon information, resulting increase of the data amount.

In order to prevent the increase of the data amount, it may be considered that the polygon information to be transmitted as drawing information is limited to data for drawing a reference object which represents a rough shape of an object, and the polygon information is processed in the drawing device to represent the object more finely.

For example, when the unevenness of the surface of a natural stone is finely represented, if the rough surface shape of the stone to be drawn is assumed to be rectangular although it has an uneven surface precisely, polygon information comprising the coordinates of the four apexes A, B, C and D of the rectangle as shown in FIG. 1 is transmitted as drawing information.

In the drawing device, the rectangle A, B, C, D is segmented in the direction U corresponding to the side AB and in the direction V corresponding to the side AC so that the rectangle is divided in a lattice form into many minute rectangles. A direction which is vertical to the plane of the rectangle ABCD is assumed, and the coordinate of each lattice point which corresponds to each apex of each minute rectangle is set while randomly displaced in the vertical direction as shown in FIG. 1. The apexes of the minute rectangles thus formed are successively linked to one another so that a fine unevenness is represented in the rectangle ABCD as indicated by broken lines of FIG. 1, whereby the surface of the natural store can be represented as if it is naturally viewed.

As described above, various types of representation such as minute unevenness, etc. can be performed even when the data amount of the polygon information to be transmitted is small.

A method using random numbers may be considered as a method of setting the coordinate of each lattice point as described above in the drawing device. However, it is general that the random number is arbitrarily generated and thus it has no reproducibility, and thus the minute shape, color, etc. of an object are varied every time the drawing operation is performed in the drawing device. Therefore, in such a device as a real-time computer graphics device in which many images are required to be formed for the same object, this method cannot be directly applied to this type of device.

SUMMARY OF THE INVENTION

The present invention has been implemented in view of the foregoing, and has an object to provide an image generating method, an image generating apparatus, a recording medium and a random number generator which can perform a more minute drawing operation with random numbers even when the data amount is small, and represent various shapes with high reproducibility.

In order to attain the above object, according to a first aspect to the present invention, an image generating apparatus for generating drawing data on the basis of a polygon drawing command and outputting the drawing data as image data, comprises means for receiving the polygon drawing command, the polygon drawing command including polygon information for drawing a reference object representing a rough shape of an object to be drawn, and an initial value given to generate quasi minute drawing information of the object, quasi random number generating means for generating a reproducible random number value on the basis of the initial value, quasi minute drawing information generating means for dividing into plural fundamental polygons an object area or a partial area of the object which is represented by the polygon information for drawing the reference object in order to generate the quasi minute drawing information, and drawing means for generating drawing data to draw the object on the basis of the plural fundamental polygons.

According to a second aspect of the presents invention, an image generating method for generating data from a polygon drawing command and outputting the drawing data thus generated as image data, comprises a step of receiving the polygon drawing command, the polygon drawing command containing polygon information to draw a reference object representing a rough shape of an object to be drawn, and an initial value given to generate the quasi minute drawing information thereof, a step of generating a reproducible random number value from the initial value, a step of dividing into plural fundamental polygons an object area or a partial area of the object which is represented by the polygon information to draw the reference object, and calculating the coordinate of each apex of the plural fundamental polygons on the basis of the random number value to generate the quasi minute drawing information, and a step of generating drawing data to draw the object on the basis of the plural fundamental polygons.

According to the present invention, the drawing information to be transmitted contains not only polygon data used to draw a reference object representing a rough shape of an object to be drawn, but also an initial value to be supplied to the quasi random number generating means which is initialized in response to input of the initial value and generates a reproducible random number. Accordingly, various object shapes can be represented on the basis of a small amount of data.

DETAILED DESCRIPTION OF THE PREFERRED EMBODIMENT

A preferred embodiment according to the present invention will be described hereunder with reference to the accompanying drawings.

An embodiment of an image generating apparatus according to the present invention will be described representatively in the case where the present invention is applied to a TV (television) game machine.

Figure 2:
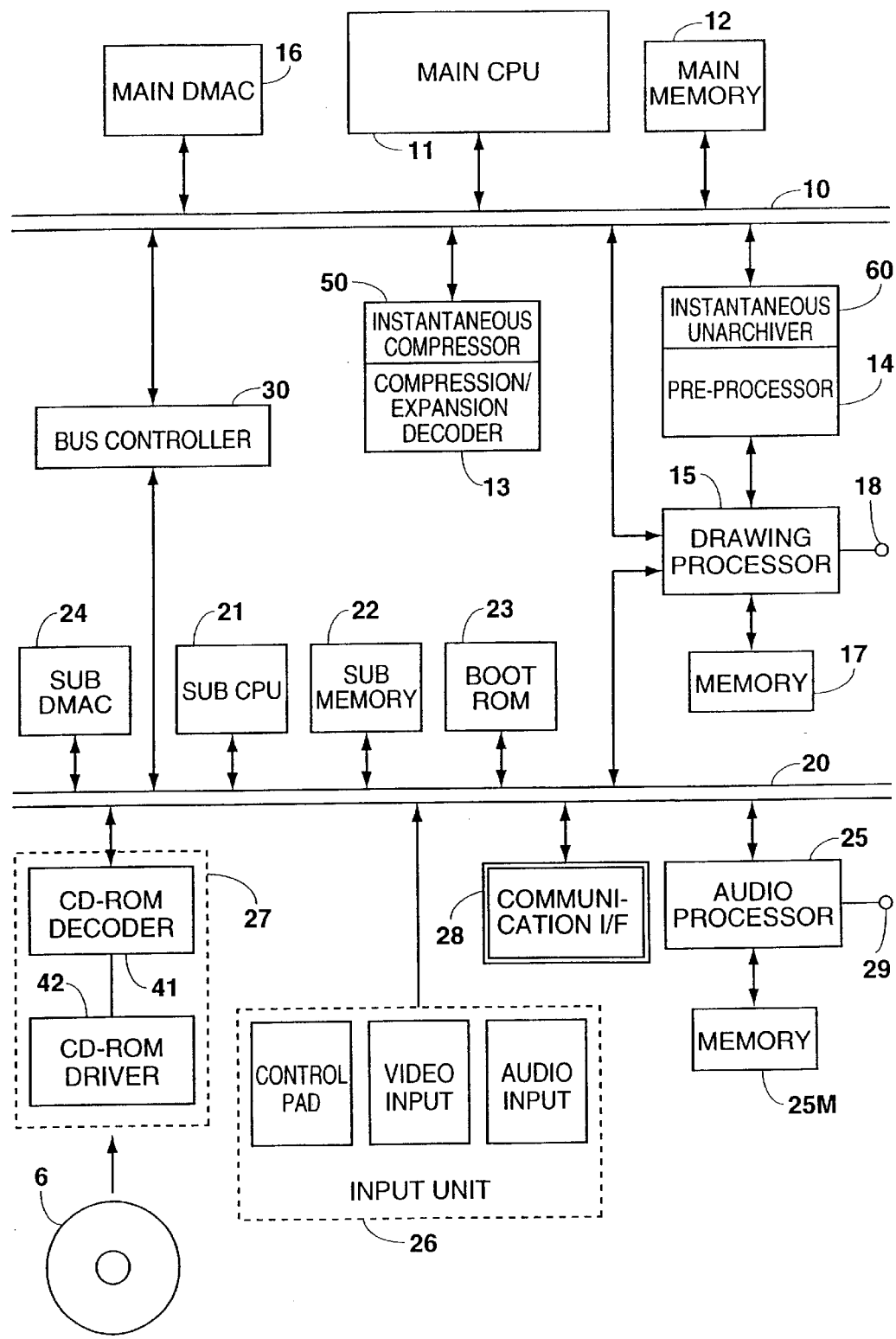
FIG. 2 is a block diagram showing a game machine to which the image generating apparatus of the embodiment is applied.

FIG. 2 is a block diagram showing the construction of a TV game machine to which the embodiment of the present invention is applied, and the game machine is assumed to have a three-dimensional graphics function and a moving picture (video) reproducing function.

Figure 3:
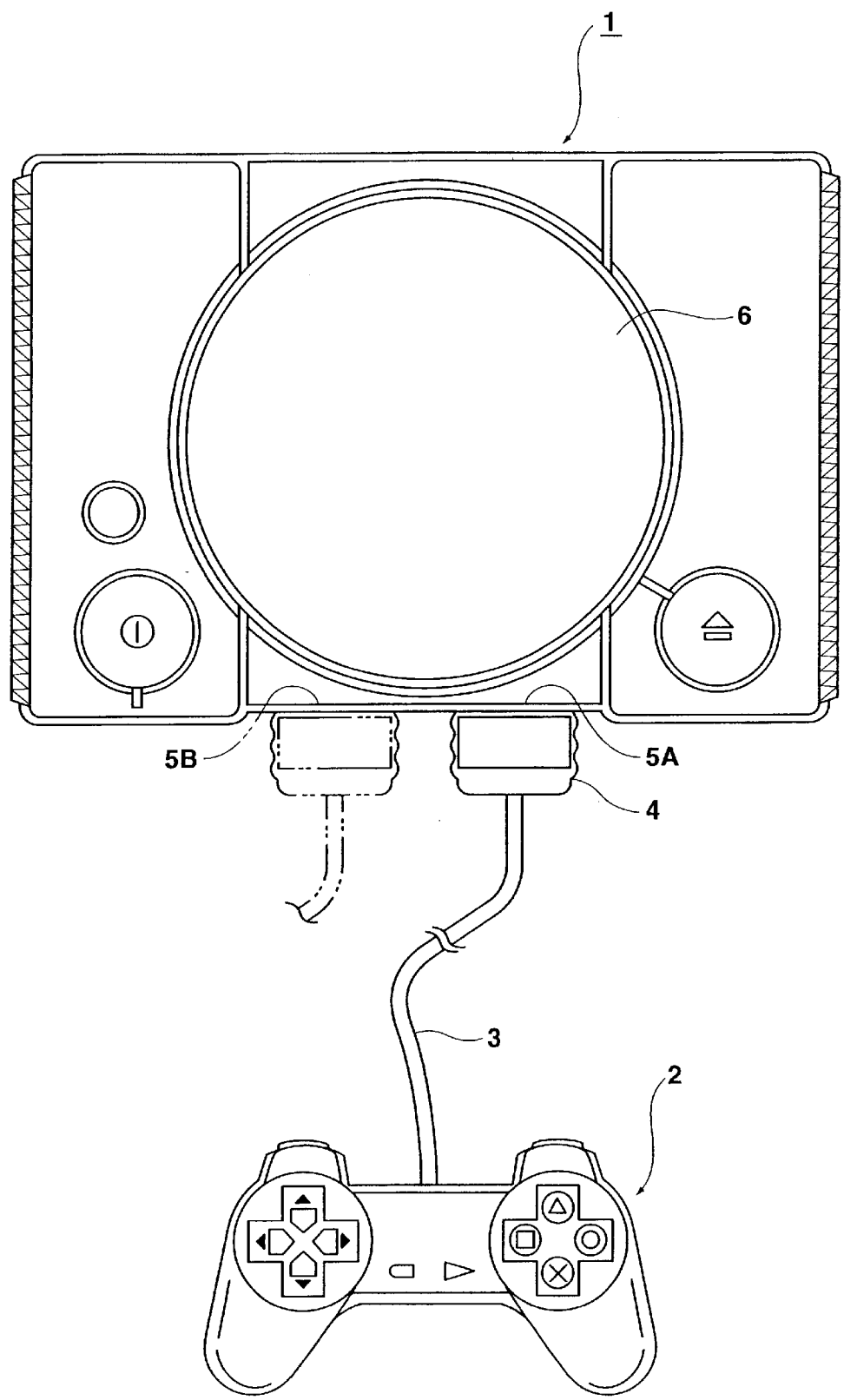
FIG. 3 is a diagram showing the outlook of the game machine to which the image generating apparatus of the embodiment is applied.

FIG. 3 shows the outlook of the game machine. The game machine includes a game machine body 1, and a control pad 2 which constitutes an operation input unit for a user. The control pad 2 is connected to a cable 3 having a connector plug 4 at the tip thereof, and the control pad 2 is connected to the game machine body 1 by linking the connector plug 4 of the cable 3 to a connector jack 5A of the game machine body 1. In this case, the game machine body 1 is provided with two connector jacks 5A and 5B so that two control pads 2 can be connected to the game machine body 1 for match play or the like.

In such a game machine, an auxiliary storage medium in which a game program, image data, etc. are recorded, for example, a CD-ROM disc 6 is loaded into the game machine body 1 to enjoy a game.

Next, the construction of the game machine will be described with reference to FIG. 2. The game machine is designed to have two system buses comprising a main bus 10 and a sub bus 20. The data communication between the main bus 10 and the sub bus 20 is controlled by a bus controller 30.

To the main bus 10 are connected to a main CPU 11, a main memory 12, an image expansion decoder 13, a preprocessor 14, a drawing processor 15 and a main DMA controller 16. The drawing processor 15 is connected to a memory 17 for processing. The drawing processor 15 contains a frame buffer (frame memory) for display data and a D/A conversion circuit, and outputs an analog video signal from the drawing processor 15 to a video output terminal 18. As not shown, the video output terminal 18 is connected to a CRT display as a display device, for example.

To the sub bus 20 are connected a sub CPU 21, a sub memory 22, a boot ROM 23, a sub DMA controller 24, a processor 25 for audio processing, an input unit 26, an auxiliary storage device unit 27, and an expansion communication interface unit 28. The auxiliary storage device unit 27 is provided with a CD-ROM decoder 41 and a CD-ROM driver 42. In the boot ROM 23 is stored a program for starting the game machine. The audio processing processor 25 is connected to an audio processing memory 25M. The audio processing processor 25 is provided with a D/A conversion circuit, and outputs analog audio signals to an audio output terminal 29.

The auxiliary storage device unit 27 decodes an application program (for example, the program of the game) and data which are recorded in the CD-ROM disc 6 which is loaded into the CD-ROM driver 42. The application program of the CD-ROM disc 6 contains a polygon drawing command.

The polygon drawing command contains a normal command when polygon drawing information for directly representing the shape of an object to be drawn is contained, and also, in this case, it contains polygon information for drawing a reference object which represents a rough shape of the object to be drawn, a command for generating quasi minute drawing information which processes the polygon information to represent a further minute shape of the object, and a special command containing an initial value which is given to a quasi random number generator used when the quasi minute drawing information is generated in the pre-processor 14 as described later. The initial value is not necessarily allocated to the object in one-to-one correspondence, but plural initial values may be set to one object if necessary. For example, an initial value may be allocated to each of fundamental polygons for drawing a reference object representing the rough shape of the object.

If the special command of the polygon drawing command is set to be recognized as a special command when it contains the initial value to be given to the quasi random number generator, it is not required to contain the command for generating the quasi minute drawing information.

In the CD-ROM disc 6 are also recorded moving pictures which are compressed by the MPEG2 system using discrete cosine transformation (DCT), image data of still pictures, and image data of texture images for decorating polygons.

The input unit 26 includes the control pad 2 serving as the operation input unit as described above, an input terminal for video signals, and an input terminal for audio signals.

The main CPU 11 manages and controls each part of the main bus 10 side, and further performs a part of processing when an object is drawn as an assemble of many polygons. As described later, the main CPU 11 generates on the main memory 12 a drawing command sequence for generating a drawing image of one frame. The data communication (reception and transmission) between the main CPU 11 and the main bus 10 is performed on a packet basis while data are packeted.

For image data of moving pictures and still pictures, the main memory 12 has a memory area for compressed video data, and a memory area for expanded video data obtained by subjecting the data to the expansion decoding processing. The main memory 12 has a memory area for graphics data such as a drawing command sequence (referred to as "packet buffer"). The packet buffer is used for the setting of the drawing command sequence in the main CPU 11 and the transmission of the drawing command sequence to the drawing processor 15.

The image expansion decoder 13 performs expansion processing on the compressed video data which are reproduced from the CD-ROM disc 6 and transmitted to the main memory, and compressed texture pattern data on the main memory 12. In this embodiment, the image compression system of MPEG2 is used, and the image expansion decoder 13 is designed in conformity with this system.

The pre-processor 14 is designed as a processor having a CPU, and it performs a part of the processing of the main CPU 11. In this embodiment, in the pre-processor 14, the polygon data contained in the drawing command transmitted from the main memory 12 are processed in the pre-processor 14 as described later to generate quasi minute drawing information, and converted to drawing information containing two-dimensional coordinate data for display.

The drawing processor 15 executes the drawing information transmitted from the pre-processor 14 and writes the result into the frame memory. The image data read out from the frame memory are output to the video output terminal 18 through the D/A converter, and displayed on the screen of the image monitor device.

The basic processing of the game machine will be described below.

[Data Access from CD-ROM Disc 6]

When the game machine of FIG. 3 is powered on and the CD-ROM disc 6 is, loaded into the game machine body 1, the program for performing so-called initialization processing to start the game in the boot ROM 23 is executed by the sub CPU 21, and then the recorded data on the CD-ROM disc 6 are accessed as described below.

That is, in the auxiliary storing device unit 27, the compressed image data, the drawing command and the program to be executed by the main CPU 11 are read out from the CD-ROM disc 6 through the CD-ROM driver 42 and the CD-ROM decoder 41, and then temporarily loaded into the sub memory 22 by the sub DMA controller 24.

The data which are taken into the sub memory 22 are transmitted to the main memory 12 by the sub DMA controller and the bus controller 30 and further by the main DMA controller 16. The sub CPU 21 is designed to directly access the frame of the drawing processor 15, and the display image content can be changed by the sub CPU 21 separately from the control of the drawing processor 15.

[Expansion and Transmission of Compressed Image Data]

In this embodiment, the compressed image data of the input data of the main memory 12 are subjected to decode processing of Haffman code by the main CPU 11, and then written into the main memory 12 again by the main CPU 11. The main DMA controller 16 transmits the image data after the decode processing of Haffman code from the main memory 12 to the image expander 13. The image expander 13 performs inverse quantization processing and inverse DCT processing to perform the expansion decode processing of the image data. The expanded image data are transmitted to the main memory 12 by the main DMA controller 16.

The main CPU 11 transmits the expanded data to the frame memory of the drawing processor 15 at the time when a constant amount of unit data which is called as a macroblock of the expanded image data are stocked into the main memory 12. At this time, when the expanded image data are transmitted to the image memory area of the frame memory of the drawing processor 15, the image data are directly displayed as a background moving picture on the image monitor device. Further, the data may be transmitted to the texture region of the frame memory of the drawing processor 15. The image data in the texture area are used to decorate polygons as a texture image.

[Processing and Transmission of Drawing Command Sequence]

According to Z data which is three-dimensional depth information, the polygons constituting the surface of the object are drawn successively from a polygon which is located at the deepest position in the depth direction, whereby an image can be displayed three-dimensionally on the two-dimensional image display plane. The main CPU 11 generates on the main memory 12 a drawing command sequence with which the polygons are successively drawn in the drawing processor 15 from the polygon which is located at the deepest position in the depth direction as described above.

The main CPU 11 calculates the motions of the object and the eyes on the basis of the operation input of the user through the control pad of the input unit 26 to generate the polygon drawing command sequence on the main memory 12.

When the drawing command sequence is completed, the main DMA controller 16 transmits the drawing command sequence from the main memory 12 to the drawing processor 15 through the pre-processor 14 every drawing command. At this time, the following generation processing of the quasi minute drawing information is performed in the pre-processor 14.

In the drawing processor 15, the data transmitted thereto are successively executed and the result is stored in the drawing area of the frame memory. At the time of the polygon drawing, the data are transmitted to a gradient calculating unit of the drawing processing unit 15 to perform a gradient calculation. The gradient calculation is to calculate the inclination of the plane of the mapping data when the inside of a polygon is filled with the mapping data by the polygon drawing. In the case of a texture, the polygon is filled with texture image data. Further, in the case of a glow, shading, the polygon is filled with brightness values.

Further, a texture of moving pictures (video) is possible. That is, in the case of the video texture, the compressed moving picture (video) data from the CD-ROM are temporarily stored in the main memory 12 as described above. The compressed video data are transmitted to the image expander 13. In the image expander 13, the compressed video data are expanded. At this time, a part of the expansion processing is performed by the main CPU 11 as described above.

The expanded video data are transmitted to the texture area on the frame memory of the drawing processor 15. The texture area is provided in the frame memory of the drawing processor 15, and thus the texture pattern itself can be rewritten every frame. When the moving pictures are transmitted to the texture area as described above, the texture is rewritten and varied dynamically every frame. If the texture mapping to the polygon is carried out by the moving pictures in the texture area, the texture of the moving pictures would be implemented.

[Generation of Quasi Minute Drawing Information in Pre-Processor 14]

Figure 4:
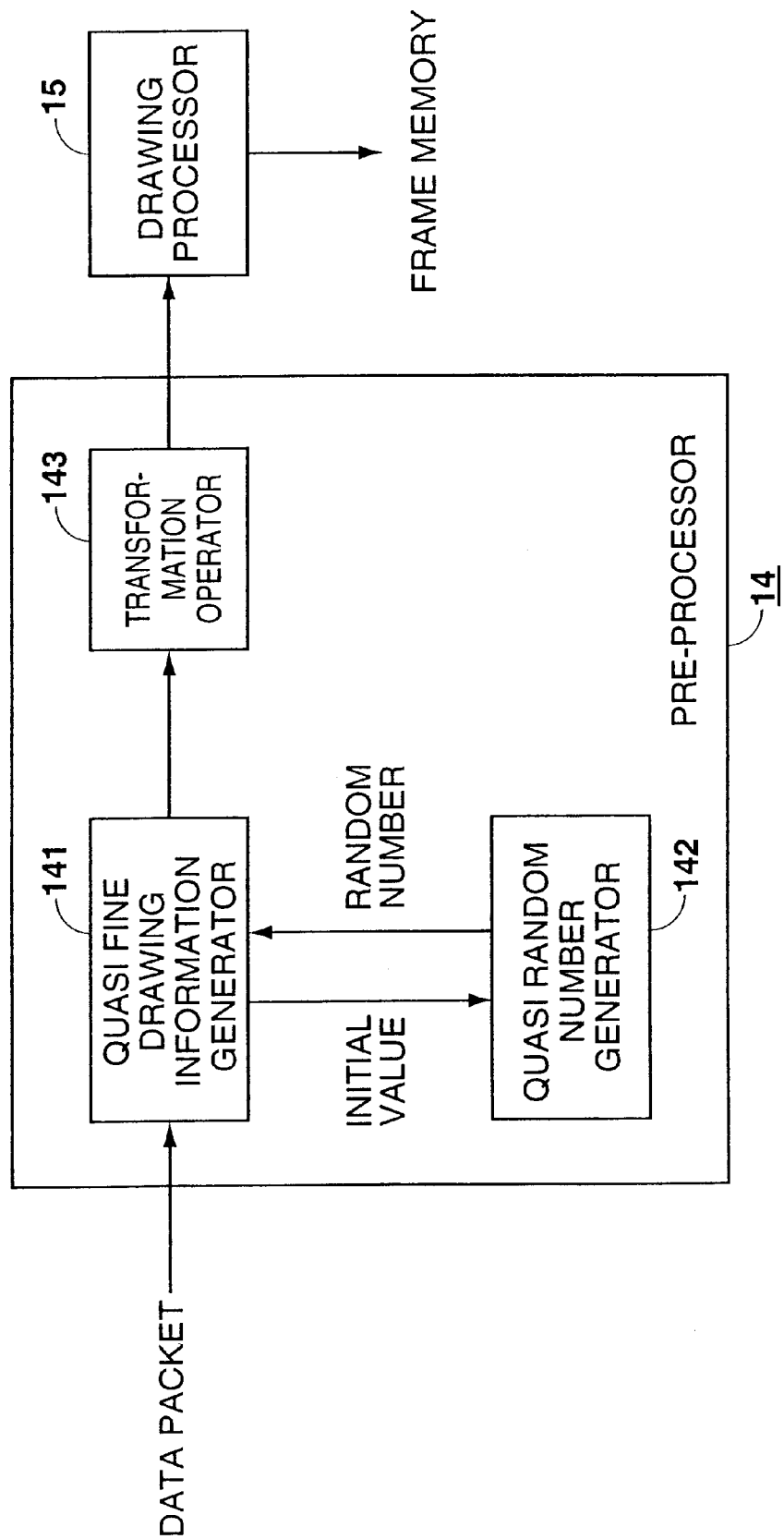
FIG. 4 is a block diagram showing a main part of the embodiment of the image generating apparatus according to the present invention.

FIG. 4 is a functional block diagram showing the processing function of the pre-processor 14 which mainly generates the quasi minute drawing information. That is, in this embodiment, the pre-processor 14 comprises a quasi minute drawing information generator 141, a quasi random number generator 142, and a transformation operator 143 for performing the coordinate transformation to a two-dimensional coordinate suitable for the drawing processing in the drawing processor 15, the perspective transformation and the light source calculation.

When the quasi minute drawing information 141 receives a normal drawing command, it supplies the drawing command to the transformation operator 143. The transformation operator 143 performs the coordinate transformation, the perspective transformation and the light source calculation on the received drawing information and then delivers the result to the drawing processor 15.

Figure 1:
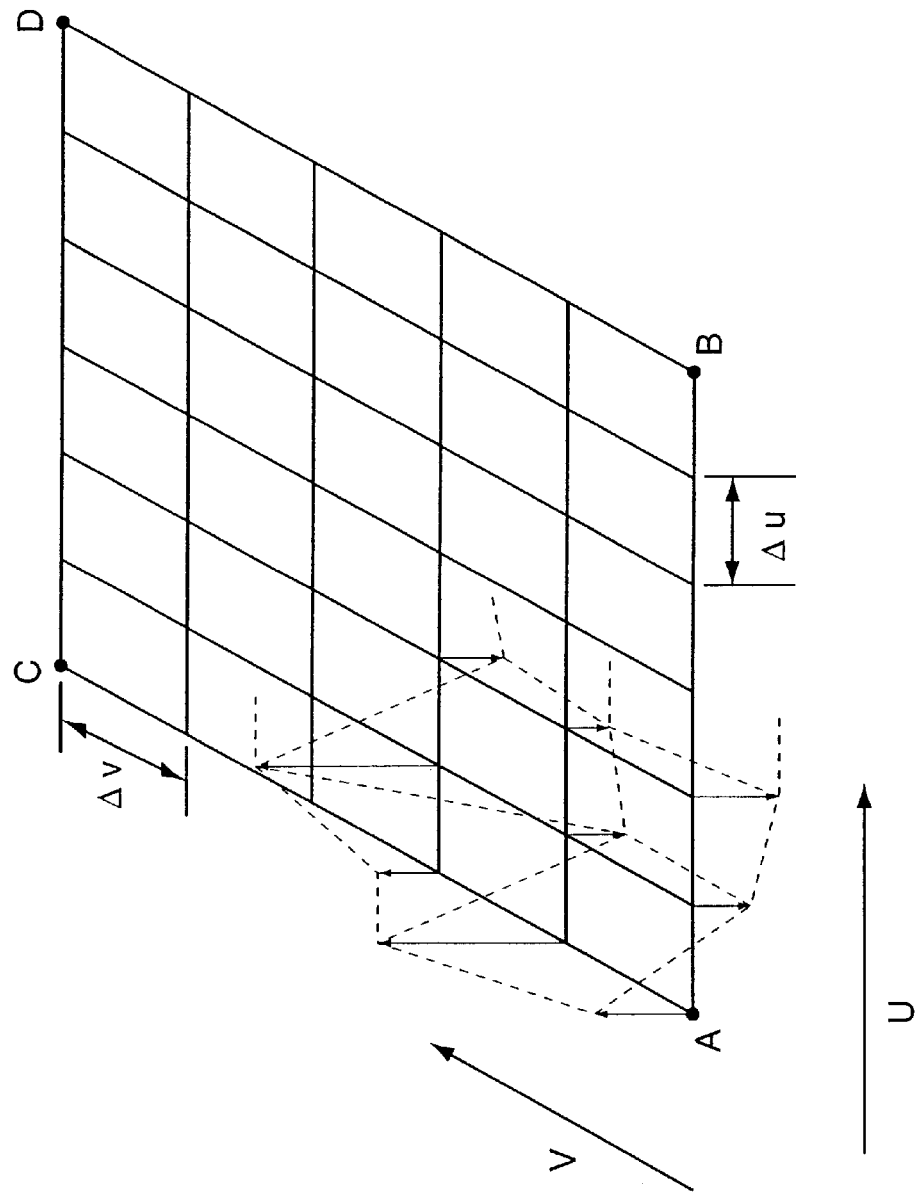
FIG. 1 is a diagram showing a drawing manner according to an embodiment of an image generating apparatus of the present invention.

When the quasi minute drawing information generator 141 receives a special command as described above and thus a fundamental polygon to be directly drawn should be represented while the fundamental polygon is further divided into minute parts, it segments the fundamental polygon in the two directions U and V in a lattice form to divide the fundamental polygon into many minute rectangles as shown in FIG. 1.

The quasi minute drawing information generator 141 supplies an initial value contained in the special command to the quasi random number generator 142 to obtain the corresponding random number from the quasi random number generator 142. The coordinate value of the lattice point at each apex of each minute rectangle is displaced in the direction vertical to the plane of the rectangle ABCD (the fundamental polygon shown in FIG. 1) on the basis of the obtained random number as shown in FIG. 1, thereby performing the coordinate transformation.

Thereafter, the quasi minute drawing information of the minute rectangle thus generated is supplied to the transformation operator 143 to perform the coordinate transformation, the perspective transformation and the light source calculation, and then supplied to the drawing processor 15. As described above, in the drawing processor 15 the object is drawn into the frame memory, and the texture mapping is performed if necessary, and the result is transmitted to the CRY display to display the drawing image.

The quasi random number generator 40 provided to the quasi random number generator 142 generates a random number sequence which is uniquely determined when it is supplied with a n initial value. In this embodiment, the quasi random number generator 41 generates a quasi random number by a linear congruent method.

Figure 5:
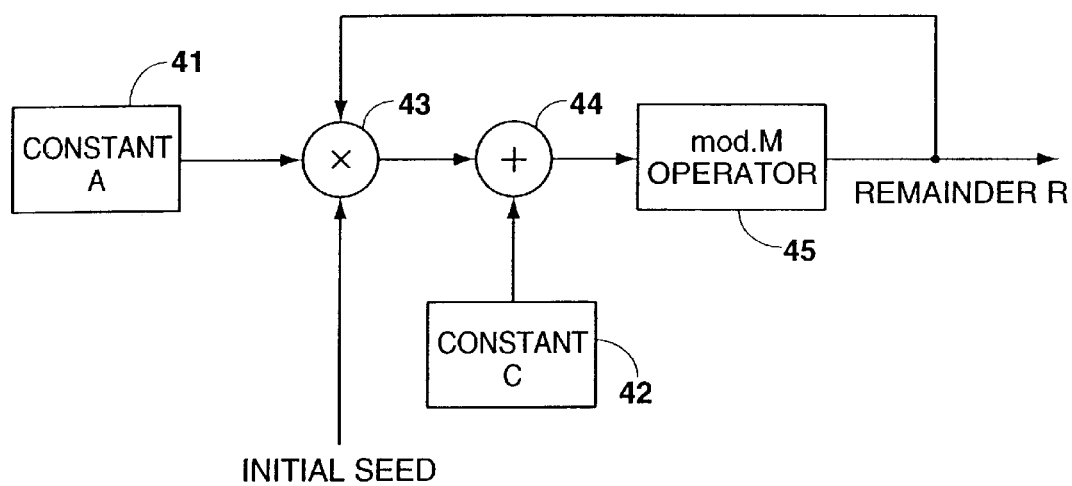
FIG. 5 is a diagram showing the construction of a quasi random number generator used in the embodiment of the image generating apparatus according to the present invention.

FIG. 5 shows the quasi random number generator 40 when the quasi random number generator 40 is implemented by hardware. As shown in FIG. 5, the quasi random number generator 40 comprises two constant generators 41 and 42 for generating a constant A and a constant C, a multiplier 43, an adder 44, and a mod.M (M represents a constant) operator 45, and it generates a random number value R. As not shown, it holds the random number value R thus generated.

The multiplier 43 multiplies the constant A from the constant generator 41 and an initial value seed (the seed is a seed for generation of random number) or a seed R (R is also the random number value which is calculated as described above) which is transmitted from the quasi minute drawing information generator 141. The adder 44 adds the multiplication result of the multiplier 43 with the constant C from the constant generator 42, and supplies the addition result to the mod.M operator 45. The mod.M operator 45 divides the addition result of the adder 44 by the constant M, and outputs the division result as a random number value.

When supplied with the initial value seed, the multiplier 43 multiplies the initial value seed and the constant A. Thereafter, when a random-number reading request is supplied from the quasi minute drawing information generator 141, the multiplier 43 supplies the quasi minute drawing information generator 141 with the current random number seed R which is held by the multiplier 43, and also performs multiplies the constant A with the current random number seed R to generate a next random seed. That is, the current seed of the quasi random number generator 40 is set to the currently-occurring random number value, and the next-occurring random number is uniquely determined by the current seed, that is, the currently-occurring random number value.

Accordingly, the quasi random number generator 40 generates the same random number sequence at all times when it is supplied with a fixed value as an initial value seed. That is, the random number can be generated with reproducibility in accordance with the initial value seed.

The quasi random number generator 40 can be constructed by the operation of software, and in this case the operation expression is represented as follows:

$$R \leftarrow (A \times R + C) \bmod M$$

In the quasi random number generator 40, a different random number sequence can be obtained by changing the constants A and C.

[Quasi Minute Drawing Algorithm 1]

Next, the processing operation of the quasi minute drawing information generator 141 will be described with reference to the flowchart of FIGS. 6 and 7. In this embodiment, the rectangle ABCD of FIG. 1 is divided in a lattice form to generate quasi minute drawing information as described above. That is, the rectangle ABCD is successively divided in the direction U at each divisional position of the direction V to settle each lattice point, and then the coordinate of each lattice point is determined with a random number value R by the quasi random number generator 40. This order is the same as that when the drawing information is generated. Further, the dividing unit distance $\Delta v$, $\Delta u$ are the same as those when the drawing information is generation.

First, in step S1, the polygon data of a fundamental object in the drawing information which is transmitted from the main memory 12 are read in. For example, the values (vector values) at the four apexes A, B, C, D on the surface of the object comprising the rectangle ABCD of FIG. 1. Further, the initial value (seed) of the quasi random number generator 40 which is affixed to the information of the object surface comprising the rectangle ABCD is read in. The read-in initial value is supplied to the quasi random number generator 40 to initialize the quasi random number generator 40. Further, a vector N which is vertical to the plane of the rectangle ABCD is calculated.

Next, the process goes to step S2 to initialize the distance v in the direction V of the side AC of the rectangle ABCD to zero. Thereafter, in step S3 it is judged whether the dividing operation in the direction V is finished. If the dividing operation is finished, this processing routine is finished. If not so, the process goes to step S4 to initialize the distance u in the direction U of the side AB to zero.

Subsequently to the step S4, the process goes to step S5 to judge whether the dividing operation in the direction U is finished. If the dividing operation is finished, the process goes to step S6 to increase the distance v in the direction V by only the unit amount $\Delta v$ and set the distance V to a next divisional position in the direction V. Thereafter, the process returns to step S3 to repeat the processing of the step S3 and the subsequent steps. If it is judged in step S5 that the dividing operation in the direction U is finished, the process goes to step S10 and subsequent steps of FIG. 7.

In step S10, the current lattice point position (x, y, z) is calculated from the vectors at the apexes A, B, C and the values of the distances u, v. Subsequently, the process goes to step S11 to read the random number value R from the quasi random number generator 40. Thereafter, the process goes to step S12 to perform the following calculation.

$$(X, Y, Z) \leftarrow (x, y, z) + R \times N \times c \qquad (1)$$

where c represents a suitable constant.

In next step S13, a minute rectangular polygon is prepared on the basis of the value (X, Y, Z) calculated from the equation (1) and the value (X, Y, Z) at the adjacent lattice point which has been already calculated, and output to the transformation operator 143 at the subsequent stage. Subsequently, in step S14, the value (X, Y, Z) which is calculated according to the equation (1) is stored in the memory to use it for the processing in step S13. Thereafter, the process goes to step S15 to increase the distance u in the direction U by only the unit amount $\Delta u$ and set the distance u to a next divisional position in the direction U, and then the process returns to the step S10 to repeat the processing of the steps S10 to S15.

The quasi minute drawing information generator 141 performs the above processing routine to generate the values (X, Y, Z) at the respective lattice points as indicated by arrows of FIG. 1, and supplies the respective values to the transformation operator 143. The drawing processor 15 receives the coordinate transformation output from the transformation operator 143 to perform the drawing operation, Therefore, as indicated by broken lines in FIG. 1, the rectangular plane ABCD is drawn as a plane having unevenness.

The random number value R used to generate this uneven plane is obtained by supplying to the quasi random number generator 40 the initial value which is recorded as additive information on the plane ABCD into the CD-ROM 6, and it is uniquely reproduced in accordance with the initial value concerned. When the division value of the lattice ($\Delta v$, $\Delta u$) and the dividing order are the same as those at the time of the generation of the drawing information, the shape of the object which is deformed as a quasi minute surface can be made perfectly coincident with that which is intended by a creator who prepares the drawing information.

That is, if the division value of the lattice ($\Delta v$, $\Delta u$) and the dividing order are fixed to predetermined values, the deformed shape of the object surface which is in conformity with the initial value seed supplied to the quasi random number generator 40 can be obtained. As described above, various shapes having reproducibility can be obtained from a small data amount of drawing information.

[Quasi Minute Drawing Algorithm 2]

Figure 6:
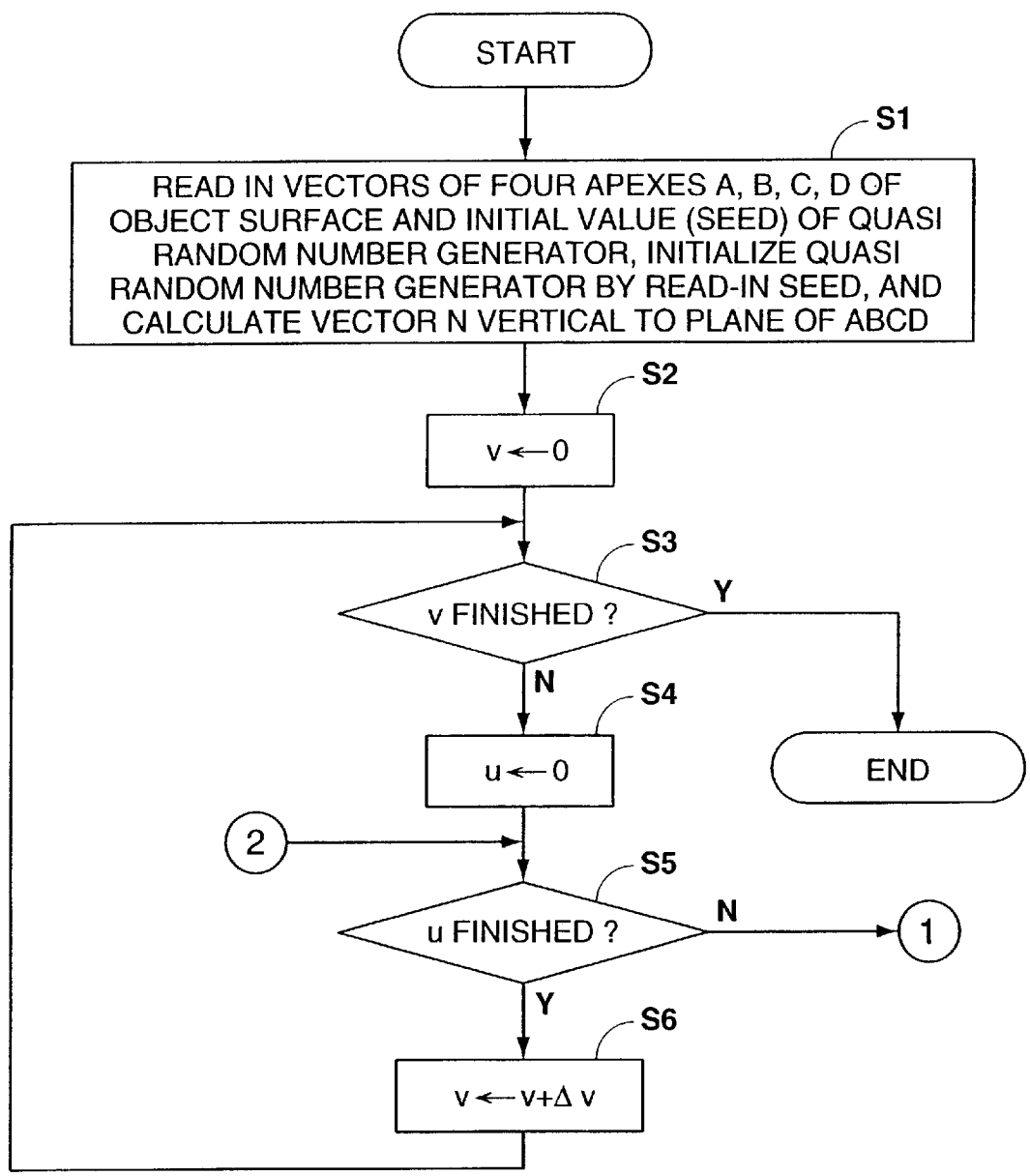
FIG. 6 is a flowchart showing a part of an algorithm 1 of the drawing operation in the embodiment of the image generating apparatus according to the present invention.
Figure 7:
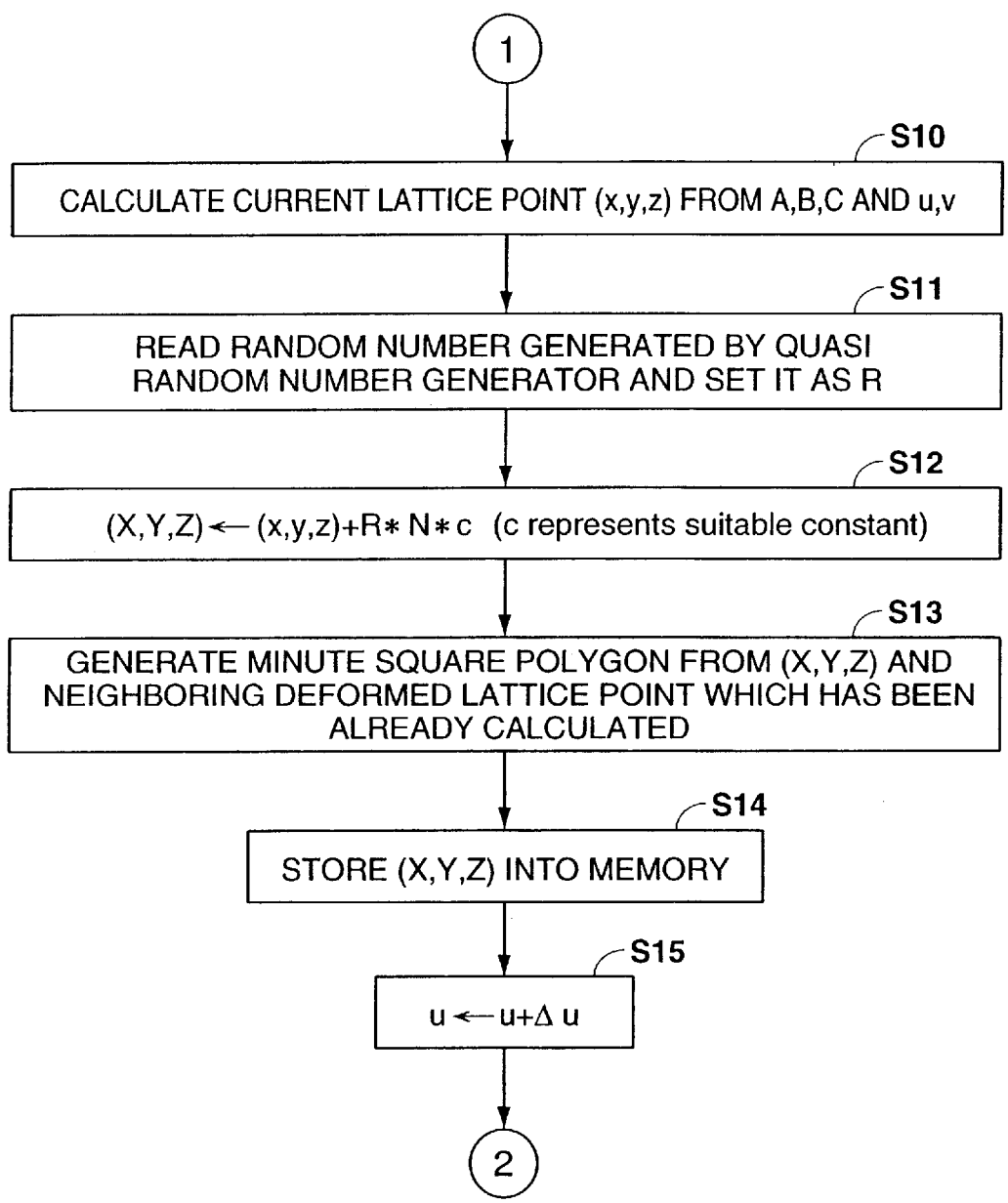
FIG. 7 is a flowchart showing the other part of the algorithm 1 of the drawing operation in the embodiment of the image generating apparatus according to the presents invention.

In the case of FIGS. 6 and 7, all the areas of the rectangular plane ABCD are displayed while subjected to the deformed uneven surface. However, there may be case where only a part of the rectangular plane ABCD is drawn due to frame clipping or the like. The time is too vain and the efficiency is too low to successively obtain the lattice points from the lattice at the distance v=0, u=0 for the minute drawing information of only a part of the rectangular plane ABCD.

Figure 8:
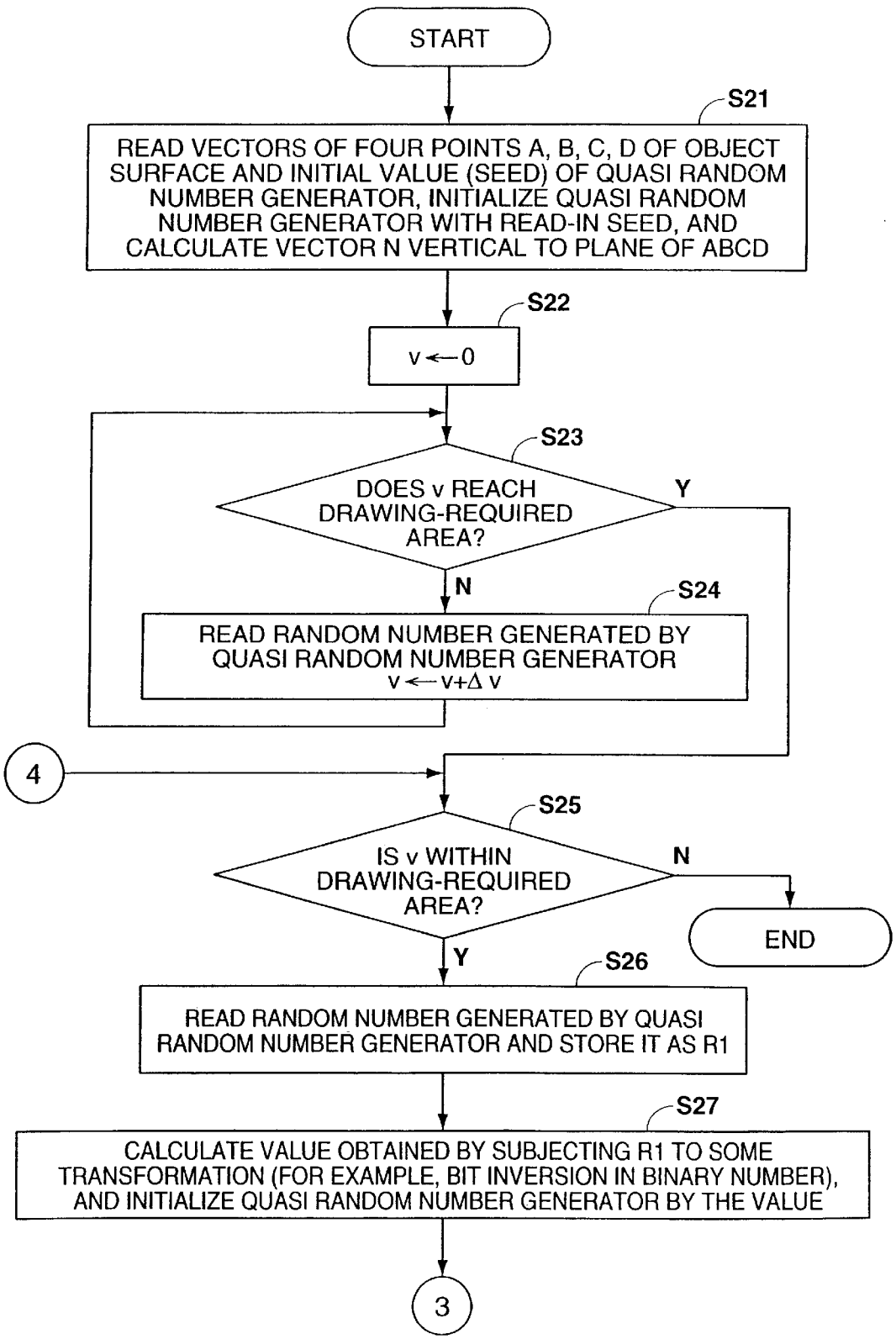
FIG. 8 is a flowchart showing a part of an algorithm 2 of the drawing operation in the embodiment of the image generating apparatus according to the present invention.
Figure 9:
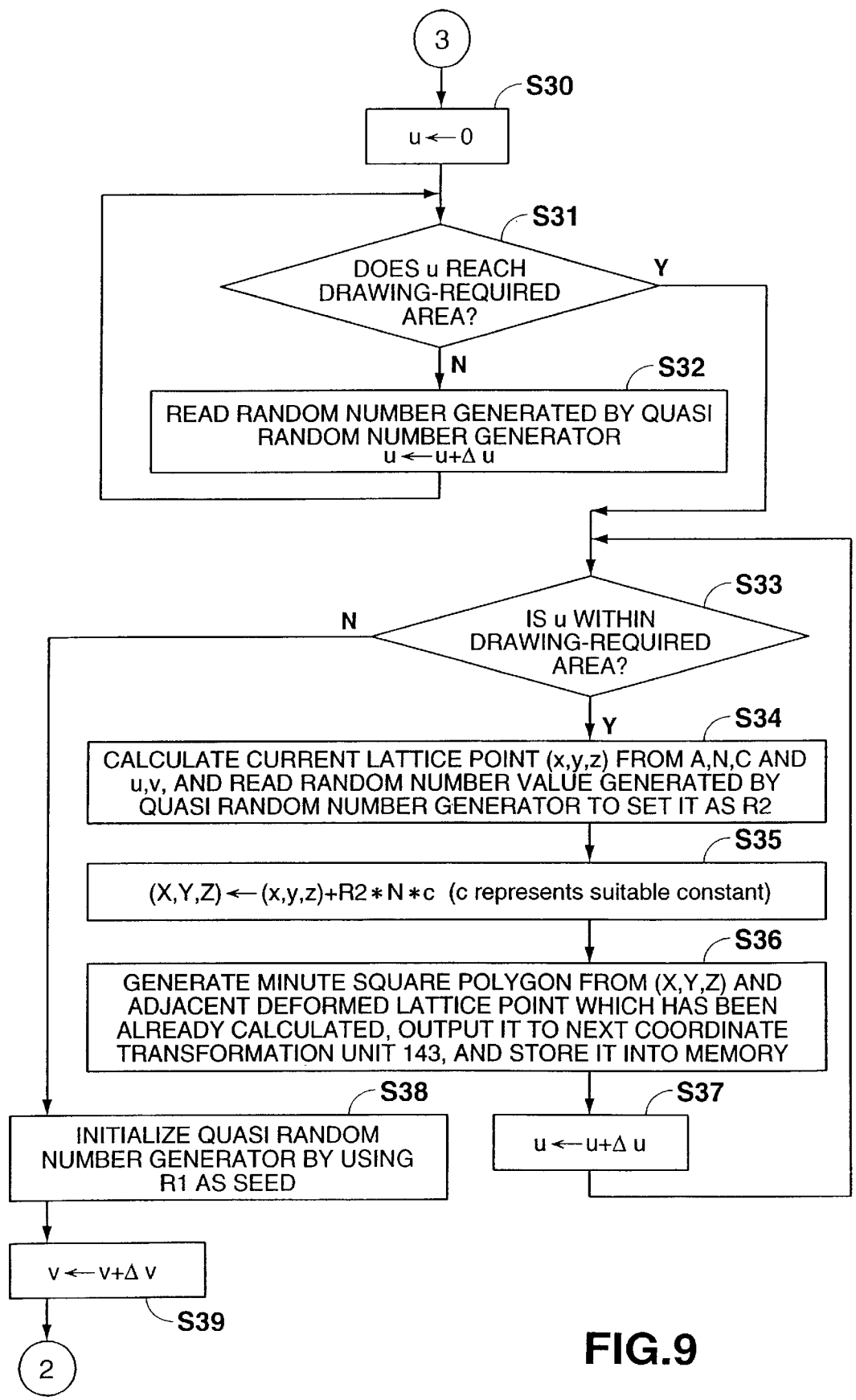
FIG. 9 is a flowchart showing the other part of the algorithm 2 of the drawing operation in the embodiment of the image generating apparatus according to the present invention.

FIGS. 8 and 9 show a processing routine of the quasi minute drawing information generator 141 which can solve the above problem.

First, in step S21, the polygon data of the fundamental object in the drawing information which is transmitted from the main memory 12 are read in. For example, the values (vector values) at the four apexes A, B, C and D of the object surface comprising the rectangle ABCD of FIG. 1 are read in. Further, the initial value (seed) of the quasi random number generator 40 which is affixed to the information of the object surface comprising the rectangle ABCD is also read in. The read-in initial value is supplied to the quasi random number generator 40 to initialize the quasi random number generator 40. Further, a vector N which is vertical to the plane of the rectangle ABCD is calculated. At this time, the information of a partial area in the rectangle ABCD, which is about to be displayed, is also obtained. This information is operated in the main CPU 11 and transmitted to the pre-processor 14.

Next, the process goes to step S22 to initialize the distance v in the direction V of the side AC of the rectangle ABCD to zero. In step S23, it is judged whether the distance v reaches an area which needs to be drawn (hereinafter referred to as "drawing-required area"). If it is judged that the processing does reach the drawing-required area, the process goes to step S24, and the generated random number value is read by the quasi random number generator 40. Further, the distance v in the direction V is increased by the unit amount Δv to set the distance v to a next divisional position in the direction V, and then the process returns to step S23 to repeat the processing of the step S23 and the subsequent steps. When a random number is read in from the quasi random number generator 40 in step S24, the quasi random number generator 40 generates a next random number by using the read-in random number value as a seed.

If it is judged in step S23 that the processing reaches the drawing-required area in the direction V, the process goes to step S25 to judge whether the distance v exceeds the drawing-required area in the direction V. If the distance v exceeds the area, the processing routine is finished. If not so, the process goes from step S25 to step S26 to read in the random number value from the quasi random number generator 40 and store the random number value as R1.

Subsequently, the process goes to step S26 to perform some transformation (for example, bit transformation in binary number) on the random number value R1, thereby initializing the quasi random number generator 40. Thereafter, the process goes to step S30 of FIG. 9.

In step S30, the distance u in the direction U of the side AB is initialized to zero, and then the process goes to a next step S31 to judge whether the distance u reaches a drawing-required area in the direction U. If the distance u does not reach the drawing-required area, the process goes to step S32 to read in the random number value generated by the quasi random number generator 40. Further, the distance u in the direction U is increased by the unit amount Δu to set the distance u to a next divisional position in the direction U, and then the process returns to step S31 to repeat the processing of the step S31 and the subsequent steps. When the random number is read in from the quasi random number generator 40 in step S32, the quasi random number generator 40 generates a next random number by using the read-in random number value as a seed.

In step S31, it is judged that the distance u reaches the drawing-required area in the direction U, the process goes to step S33 to judge whether the distance u exceeds the drawing-required area in the direction U. If the distance u is within the drawing-required area, the process goes to step S34.

In step S34, the current lattice-point position (x, y, z) is calculated from the apex vectors A, B, c and the values of the distance u, v. The random number value is read in from the quasi random number generator 40, and it is set as R2. Thereafter, the process goes to step S35 to perform the following calculation.

$$(X, Y, Z) \leftarrow (x, y, z) + R2 \times N \times c \qquad (2)$$

where c represents a suitable constant.

In next step S36, a minute rectangular polygon is prepared from the value (X, Y, Z) calculated from the equation (2) and the value (X, Y, Z) at the adjacent lattice point which has been already calculated, and output to the transformation operator 143 at the subsequent stage. Further, the value (X, Y, Z) calculated from the equation (2) is stored into the memory to be used for the processing in step S34. The process goes to step S37 to increase the distance u in the direction U by the unit amount Δu and set the distance u to a next divisional position in the direction U, and then the process returns to the step S33 to repeat the processing of the steps S33 to S37.

In step S33, it is judged whether the distance u exceeds a drawing-required area in the direction U, the process goes to step S38 to initialize the quasi random number generator 40 by using the random number value R1 stored instep S26 as a seed. The process goes to step S39 to increase the distance v in the direction V by the unit amount Δv and set the distance v to a next divisional position in the direction V, and then the process returns to step S25 to repeat the processing of the step S25 and the subsequent steps.

By executing the above processing routine, the quasi minute drawing information generator 141 can perform the processing efficiently when the minute drawing information on a partial area of the rectangular plane ABCD.

Figure 10:
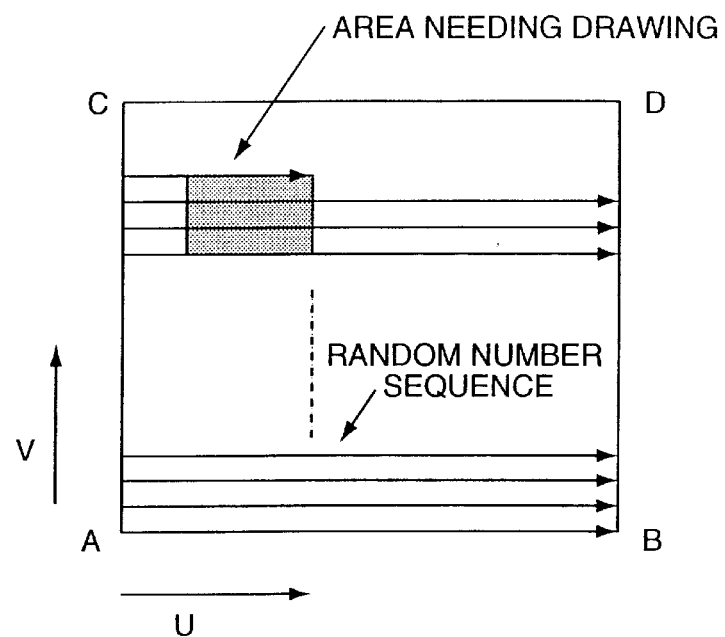
FIG. 10 is a diagram to explain a merit of the algorithm 2.

That is, in the case of the processing routine shown in FIGS. 6 and 7, the random number is successively calculated for each divisional position in the direction V and the direction U. In this case, even when only a partial area of the rectangular plane ABCD as indicated by oblique lines of FIG. 10 is required to be drawn, the random numbers at all the lattice points until the lattice point reaches a drawing-required area must be generated. Therefore, it takes a long time until the divisional position reaches the drawing-required area, resulting in reduction of efficiency.

Figure 11:
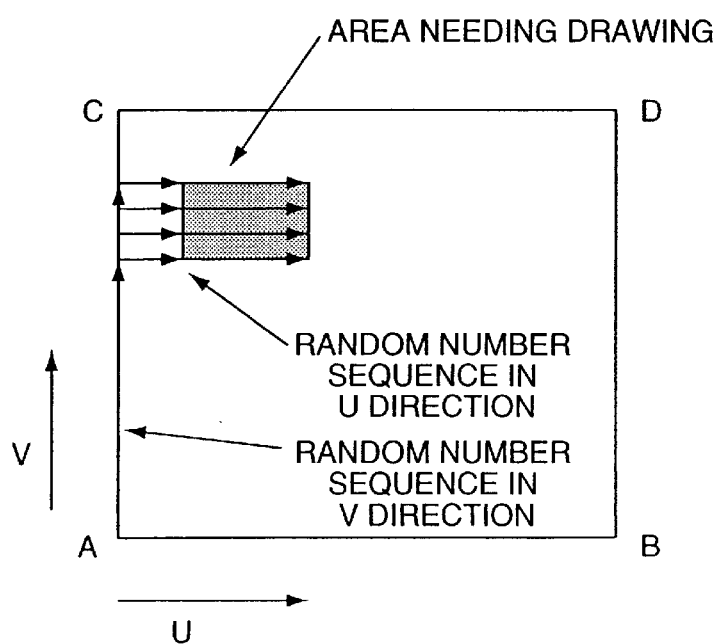
FIG. 11 is a diagram to explain a merit of the algorithm 2.

On the other hand, in the case of the processing routine shown in FIGS. 8 and 9, as shown in FIG. 11, the divisional lattice position is first moved in the direction V until the drawing-required area, and the random number of the quasi random number generator 40 is calculated as R1, and R1 is stored as the random number seed of the lattice-point position for the direction V.

When the random number for the direction U is generated in the quasi random number generator 40 by using the seed R1 as an initial value, the random number sequence for the direction V is identical to that for the direction U. Accordingly, the random number seed is subjected to the transformation to generate a value R2. The quasi random number generator 40 is initialized by using the value R2 as an initial value so that a random number sequence which is different from that for the direction V can be generated for the direction U. Further, the generation of the random numbers for the direction U is performed only within the drawing-required area as shown in FIG. 11. When the generation of the random number within the drawing-required is finished, the process is shifted to the next divisional lattice-point position in the direction V. During this shift, the quasi random number generator 40 is initialized by using the stored random number seed R1, and the random number in the direction V is generated t obtain and store the random number at the next divisional lattice point position in the direction V.

In the same manner as described above, with respect to the direction U, the stored random number seed is transformed, and the quasi random number generator 40 is initialized by using the transformation result. For the direction U, a random number sequence which is different from that for the direction V is generated, and the same operation as described above is repeated.

Accordingly, in the case of the processing routine shown in FIGS. 8 and 9, when the drawing is performed on a partial area, the random numbers can be obtained efficiently, and the calculation amount can be saved, so that the drawing information can be generated at high speed.

The method of the processing routine as shown in FIGS. 8 and 9 is not limited to the two-dimensional lattice structure as described above, and it may be extended to a multidimensional lattice structure of three-dimension or more.

In the embodiment of FIGS. 8 and 9, the random number obtained in the direction V is subjected to some transformation, and then the value thus obtained is used as an initial value for the random number sequence for the direction U. However, a plurality of quasi random number generators for generating random number sequences which are independent of and different from each other may be provided to output random numbers for the direction V and the direction U from the different quasi random number generators, thereby obtaining random numbers having less correlation for the direction U and the direction V. This method may be extended to the multidimensional lattice structure of three dimension or more.

As described above, by providing a plurality of quasi random number generators in the image generating apparatus for computer graphics, various quasi random number sequences can be generated, and the drawing representation method and the processing efficiency are enhanced.

[Quasi Minute Drawing Algorithm 3]

Figure 12:
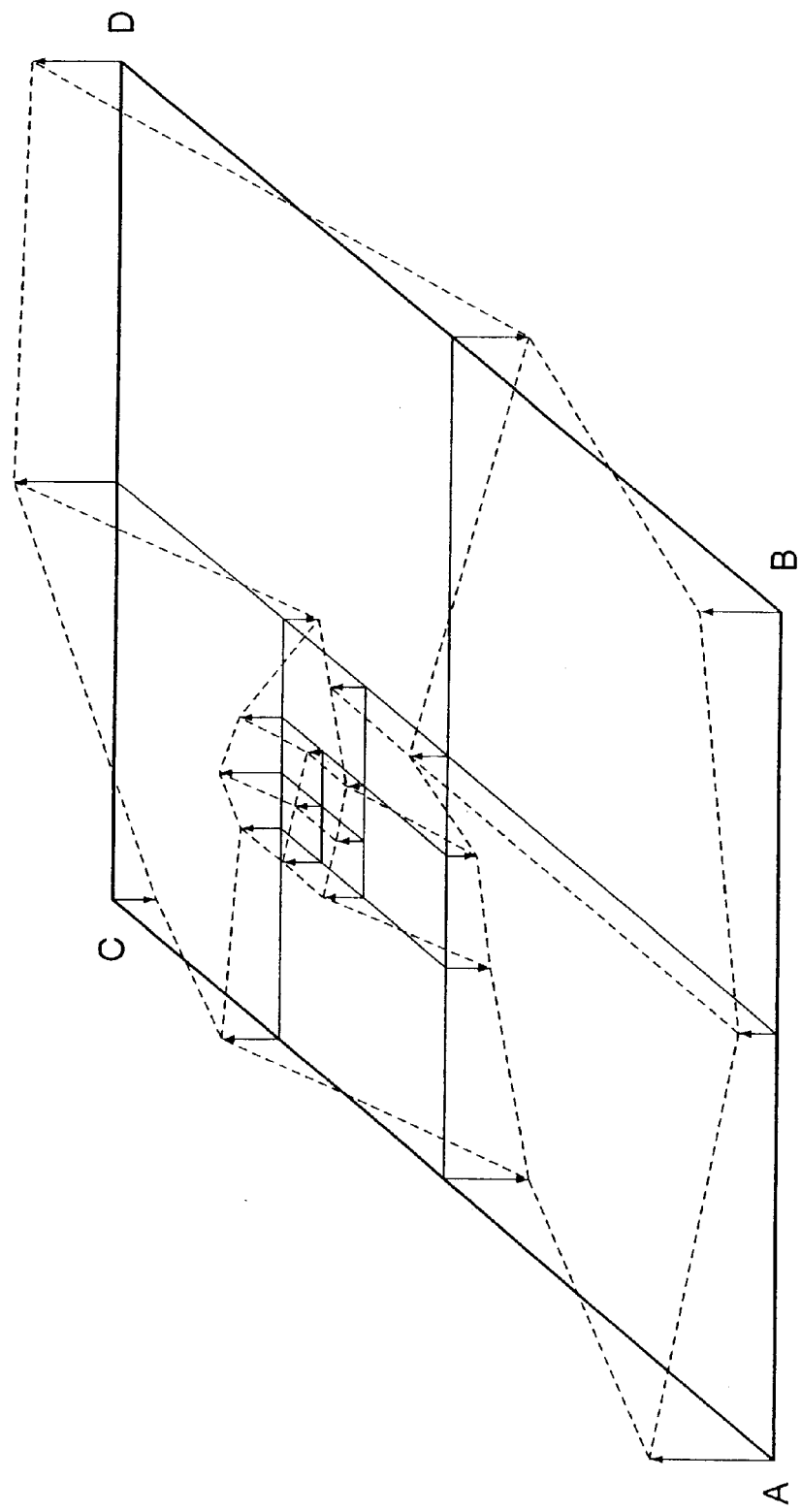
FIG. 12 is a diagram showing an algorithm 3 of the drawing operation of the embodiment of the image generating apparatus according to the present invention.

In the above algorithm 2, the image generating processing is applied to an object generation area by setting n-dimensional lattice points as representative points. In the case of the following algorithm 3, the rectangle ABCD plane is recurrently divided and deformed as shown in FIG. 12.

Figure 13:
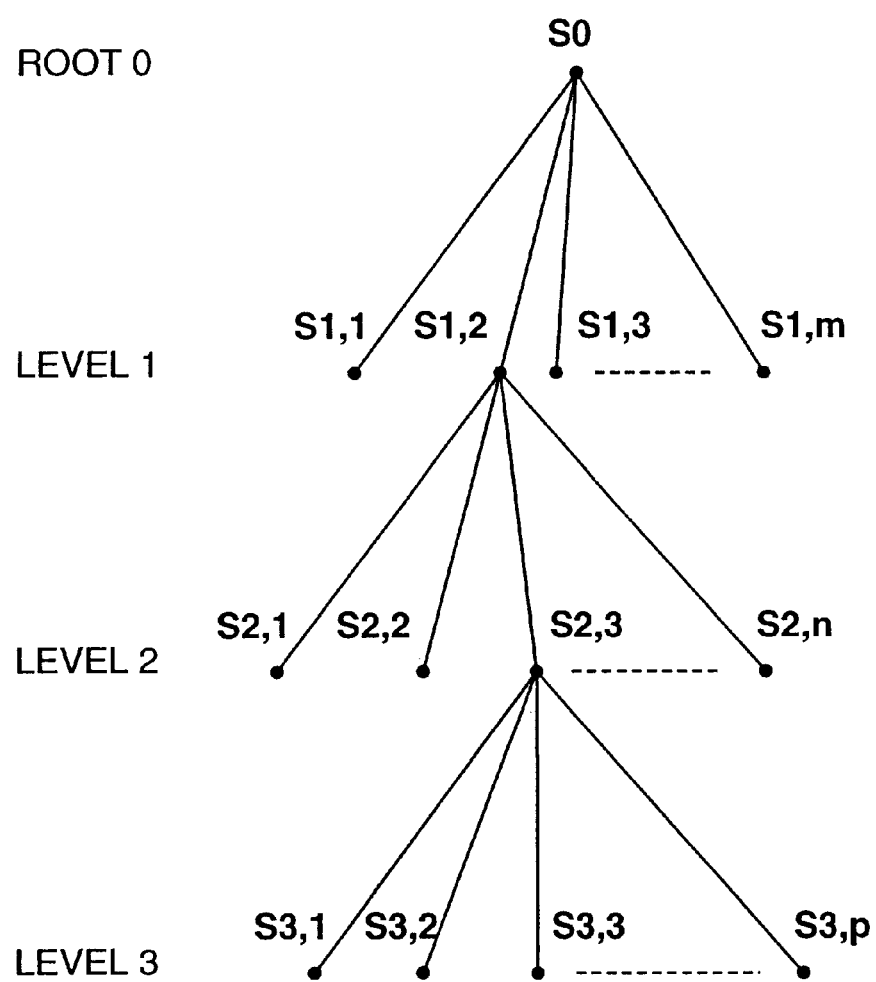
FIG. 13 is a diagram in which a recurrent structure is represented by a tree structure.

The recurrent structure can be represented by the tree structure as shown in FIG. 13. That is, the divisional level is successively shifted from the root to a lower level. Each level has plural nodes. In the case of FIG. 12, the rectangle ABCD is the root. The level 1 means that the rectangle ABCD is divided into four parts, and the level 2 means that each of the four rectangles of the level 1 is further divided into four parts. Likewise, in the case of FIG. 12, the four-part division is performed at each node to generate new five apexes for each node, thereby generating four sub areas.

In the algorithm 3, if five reproducible random numbers are obtained, a sub area which is deformed by the random numbers can be recurrently generated. In the following algorithm 3, reproducible random numbers are generated in the tree structure to implement the above.

Here, the random number value at an i-th node (i=1, 2, . . . ) from the left in level j (j=1, 2, . . . ) is represented by $S_{j,i}$. Further, the quasi random number generator 142 is assumed to have a stack T having a last-in last-out structure to store the seed of the random number.

Figure 14:
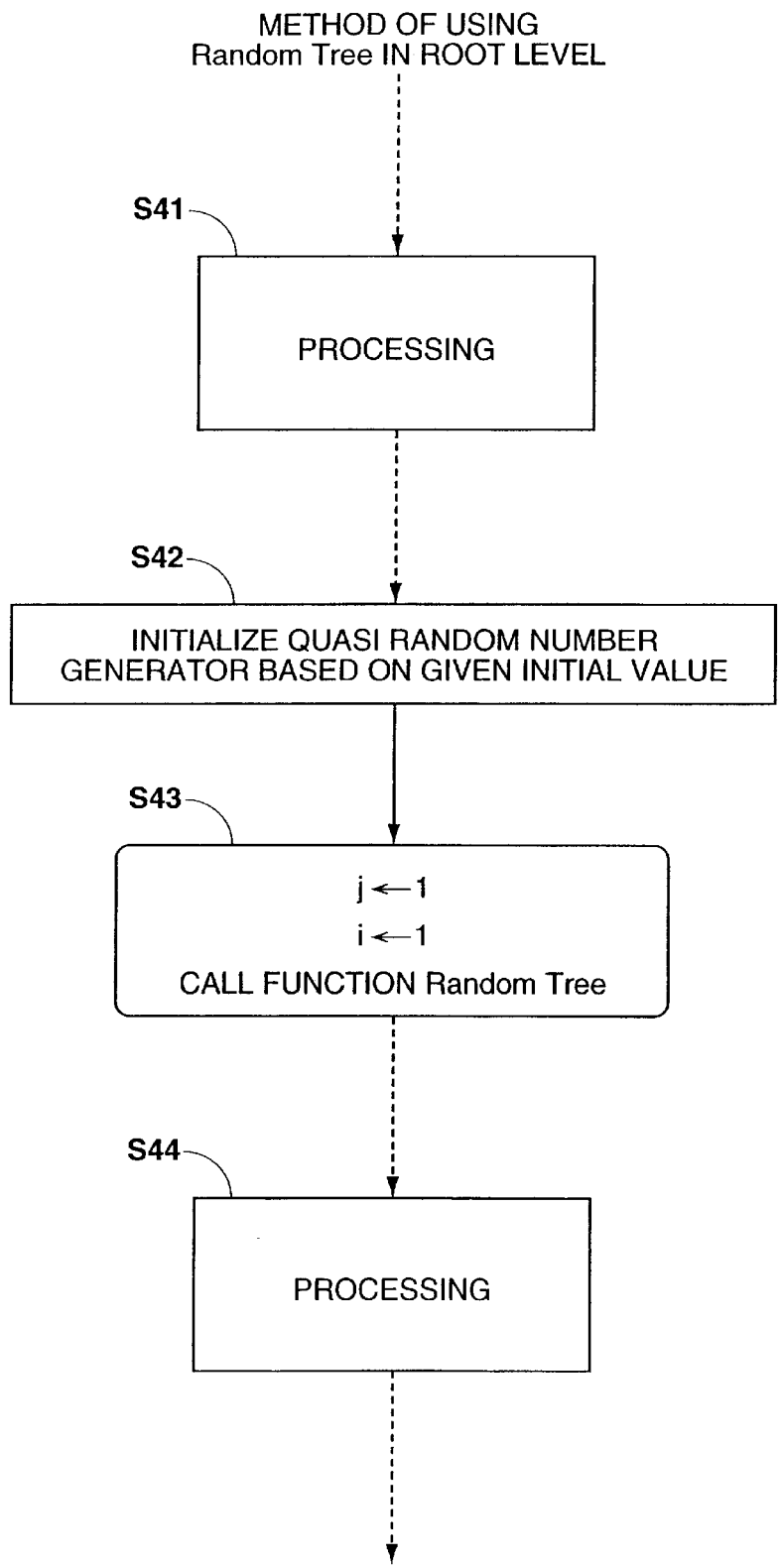
FIG. 14 is a flowchart showing a part of the algorithm 3 of the drawing operation in the embodiment of the image generating apparatus according to the present invention.
Figure 15:
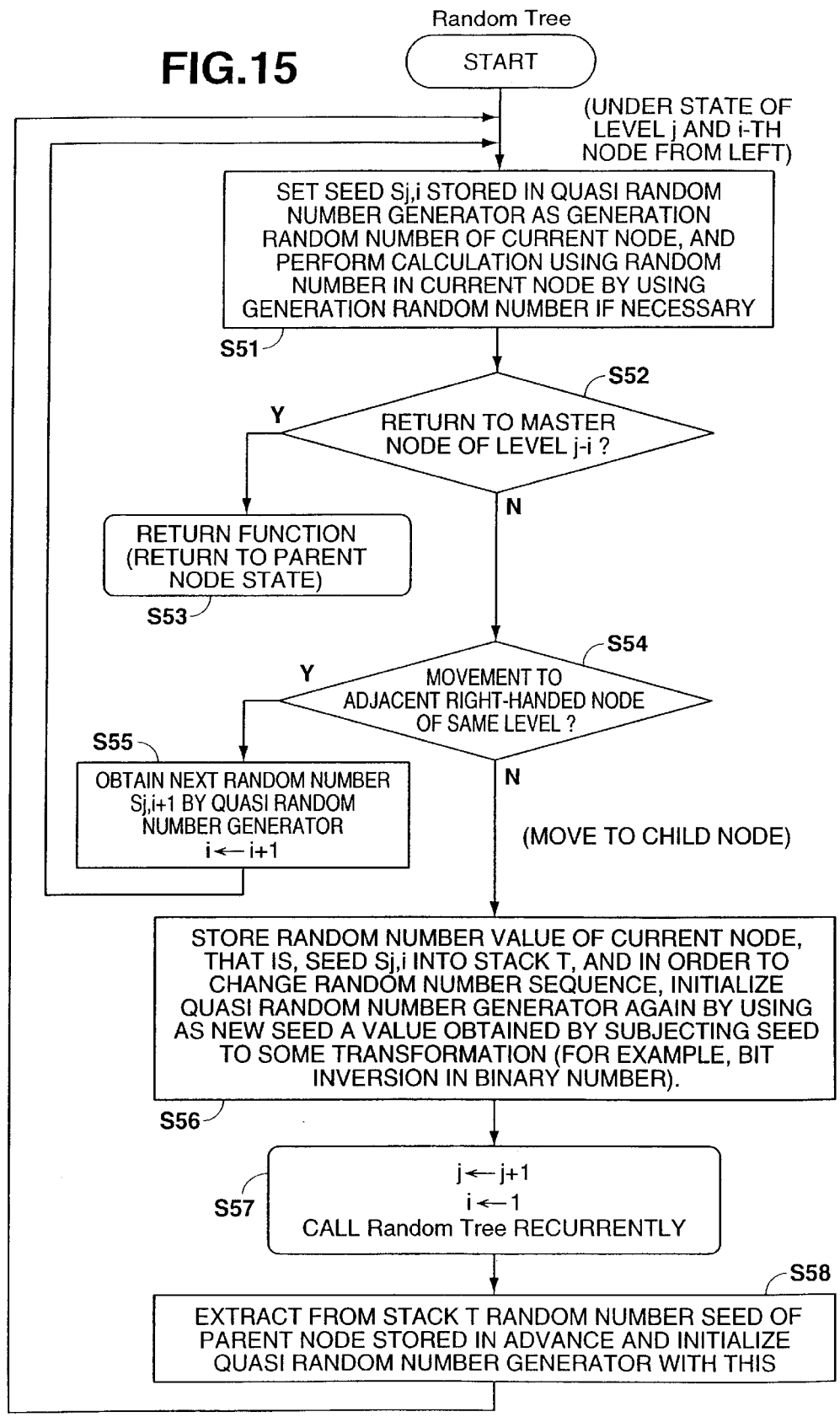
FIG. 15 is a flowchart showing the other part of the algorithm 3 of the drawing operation in the embodiment of the image generating apparatus according to the present invention.

The processing flow of the quasi random number generator 142 at this time is shown in FIG. 14. When the initial value is given, the quasi random number generator 40 is initialized on the basis of the given initial value in step S42. In step s43, a function (Random Tree) comprising a processing flow shown in FIG. 15 is called by setting j and i to 1 respectively.

Next, the processing routine of the function Random Tree of FIG. 15 will be described.

In the first step S51 of the processing routine, when the function is called under the condition of the level j and the i-th node from the left, j=1 and i=1. In step S51, the seed $S_{j,i}$ stored in the quasi random number generator 40 is set as a generation random number in the current node. If occasion demands, a calculation using the random number at the current node is performed by using the seed $S_{j,i}$.

In next step S52, it is judged whether the current node should be returned to a parent node. If the node is judged to be returned, the function Random Tree is returned (finished), and the current node is returned to the parent node state (step S53). If the current node is not returned to the parent node, the process goes to step S54 to judged whether the current node moves to the right-handed node of the same level. That is, in this case, the following rule is set: if nodes have the same level, the current node is certainly shifted in the right direction. Therefore, the current node is successively shifted to the just right node. If the current node is shifted to the just right node, the process goes to step S55 to obtain a next random number $S_{j,i+1}$ from the quasi random number generator 40, and then the process returns to step S51.

If it is judged that the current node is not shifted to the just right node, the process goes to step S56 for shift to an child node, and the random number value of the current node, that is, the seed $S_{j,i}$ is stored in the stack T. In order to change the random number sequence, this seed is subjected to some transformation, for example, bit inversion in binary number, and the value thus obtained is set as a new seed to initialize the quasi random number generator 40 with the new seed again. Subsequently, in step S57, j is incremented to shift to an child node at the leftmost end of the next level and 1 is substituted into i, and then the function Random Tree function is recurrently called.

If the processing of the step S57 is finished, the process goes to step S58 to take out the random number seed of the parent node from the stack T and initialize the quasi random number generator 40 with the random number seed, and the process returns to the step S51.

The information of the object surface can be processed to be recurrently divided and deformed by the reproducible random number which is obtained by the above algorithm 3. Further, even when the random number value of a specific node is obtained, the overall search is not necessary. Therefore, the information of the object surface can be processed with high efficiency.

The random number generating method at the n-dimensional lattice structure of the algorithm 1 and the algorithm 2 as described above may be applied as a part of the algorithm having the above recurrent structure. That is, a tree structure of n level may be assumed and the number of nodes at each level may be treated as the number of lattices on each dimensional axis. That is, the random number generating method of the present invention may be directly applicable to the drawing representing method including a combination of the lattice structure and the tree structure.

[Construction Examples of Quasi Random Number Generator 142]

[Construction 1]

When the random number of the area to be drawn is calculated in the above algorithm 2 or when the random number is required from nodes other than the node at the leftmost of each level in the algorithm 3, if a function of obtaining a random number which is located ahead at the distance corresponding to a specified number is provided as a function of the quasi random number generator 142, the processing can be performed highly efficiently.

Figure 16:
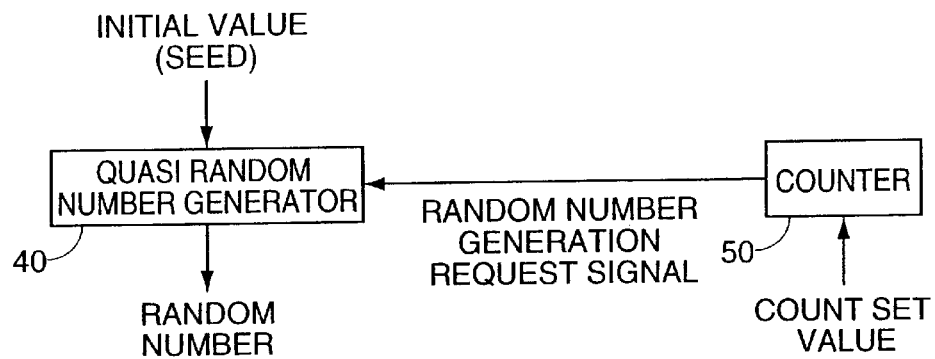
FIG. 16 is a block diagram showing the construction of a quasi random generator in the embodiment of the image generating apparatus according to the present invention.

FIG. 16 shows the construction of the quasi random number generator 142 which meets this requirement. That is, in this case, the quasi random number generator 40 is provided with a counter 50. When the count value thereof is larger than 0, the counter 50 transmits a random number generation request signal to the quasi random number generator 40 once at each count value. When the random number generation request is transmitted, it decrements the count value in response to a next clock. That is, it counts down. When the count value is equal to zero, the counter 50 stops the count and the generation of the random number generation request signal.

The counter 50 presets the count set value by the quasi minute drawing information generator 141, and starts the down-count from the count set value. Accordingly, only the count set value is generated on the basis of the random number generation request signal.

On the other hand, the quasi random number generator 40 is initialized by the initial value (seed) from the quasi minute drawing information generator 141, and generates a next random number seed by using the generated random number value as a seed every time the random number generation request signal comes, and changes the random number seed held therein to the newly generated random number. Further, even when the random number request signal comes from the quasi minute drawing information generator 141, if the count value of the counter 50 is larger than 0, the quasi random number generator 40 in this embodiment does not directly deliver the random number at that time to the quasi minute drawing information generator 141, but waits until the count value is equal to zero. If the count value is equal to zero, the quasi random number generator 40 delivers the random number seed at that time to the quasi minute drawing information generator 141.

Accordingly, for example, when a partial area is drawn, if the number of random numbers in the direction V and the direction U until a drawing-required area is known, the preset count set value of the counter 50 is set to the number to thereby calculate desired random numbers at high speed. That is, by the quasi random number generator 142 shown in FIG. 16, a random number which is located ahead at the distance corresponding to any predetermined number can be calculated at high speed.

[Construction 2]

Figure 17:
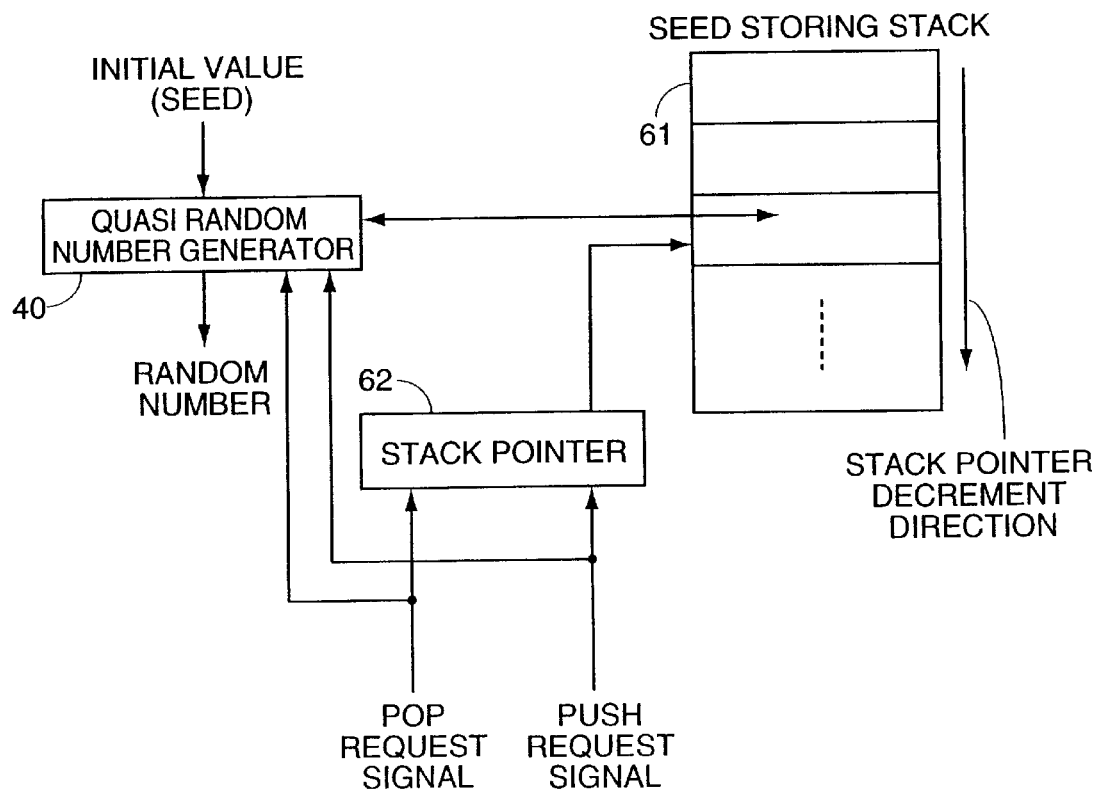
FIG. 17 is a block diagram showing the construction of the quasi random number generator in the embodiment of the image generating apparatus according to the present invention.

In the above-described algorithm 3, the quasi random number generator 142 has the stack for storing the random number seed. FIG. 17 shows the construction of the quasi random number generator 142 containing the stack. In this embodiment, a seed storing stack 61 is provided and a stack pointer 62 is provided to enable a stack operation.

In this embodiment, a push request signal and a pop request signal are supplied to the stack pointer 62 by the quasi minute drawing information generator 141, for example, and also supplied to the quasi random number generator 40.

When the push request signal is input to the quasi random number generator 142 of FIG. 17, the stack pointer 62 is decremented, and the current seed of the quasi random number generator 40 is stored at a storage place representing the stack pointer of the stack 61.

When the pop request signal is input, the random number seed which is stored at the storage place indicated by the stack pointer 62 of the stack 61 is returned to the quasi random number generator 40 to initialize the quasi random number generator 40. Thereafter, the stack pointer 62 is incremented.

Accordingly, the generation of the reproducible random number having the recurrent structure in the algorithm 3 can be performed with high efficiency.

[Construction 3]

In order to generate other quasi random numbers of a different pattern just after a random number seed is stored in the stack the above-described algorithm 3, some transformation is performed. The quasi random number generator 142 in the case of FIG. 18 is provided with a sheet transformation unit 63 for automatically performing the transformation.

Figure 18:
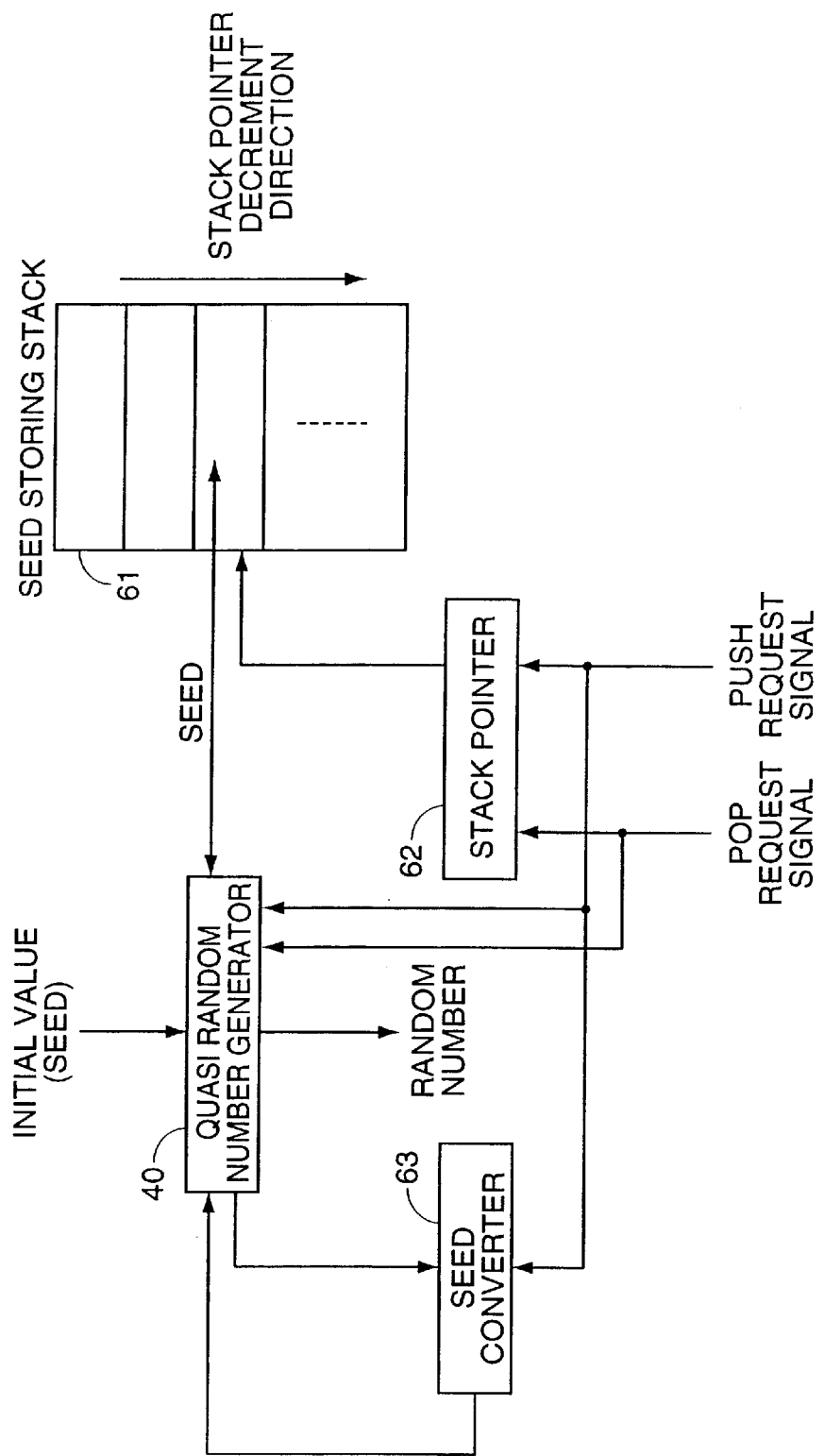
FIG. 18 is a block diagram showing the construction of the quasi random number generator in the embodiment of the image generating apparatus according to the present invention.

That is, when supplied with the push request signal, the seed transformation unit 63 of FIG. 18 reads out the current random number seed from the quasi random number generator 40 to subject the current random number to alteration processing such as the bit inversion in binary number, for example. The random number seed after the alteration processing is performed is stored as the new current random number seed into the storage unit of the quasi random number generator 40. Accordingly, the random number after subjected to some alteration processing can be directly obtained on the basis of the random number request signal from the quasi minute drawing information generator 141. The other construction and operation are the same as those of the example shown in FIG. 17.

According to the embodiment of FIG. 18, the processing of the recurrent structure algorithm can be performed at higher speed. In place of the bit inversion, various transformation operations such as bit rearrangement, Exclusive OR operation with a specific bit pattern, etc. may be used as the seed transformation in the seed transformation unit 63.

[Construction 4]

Figure 19:
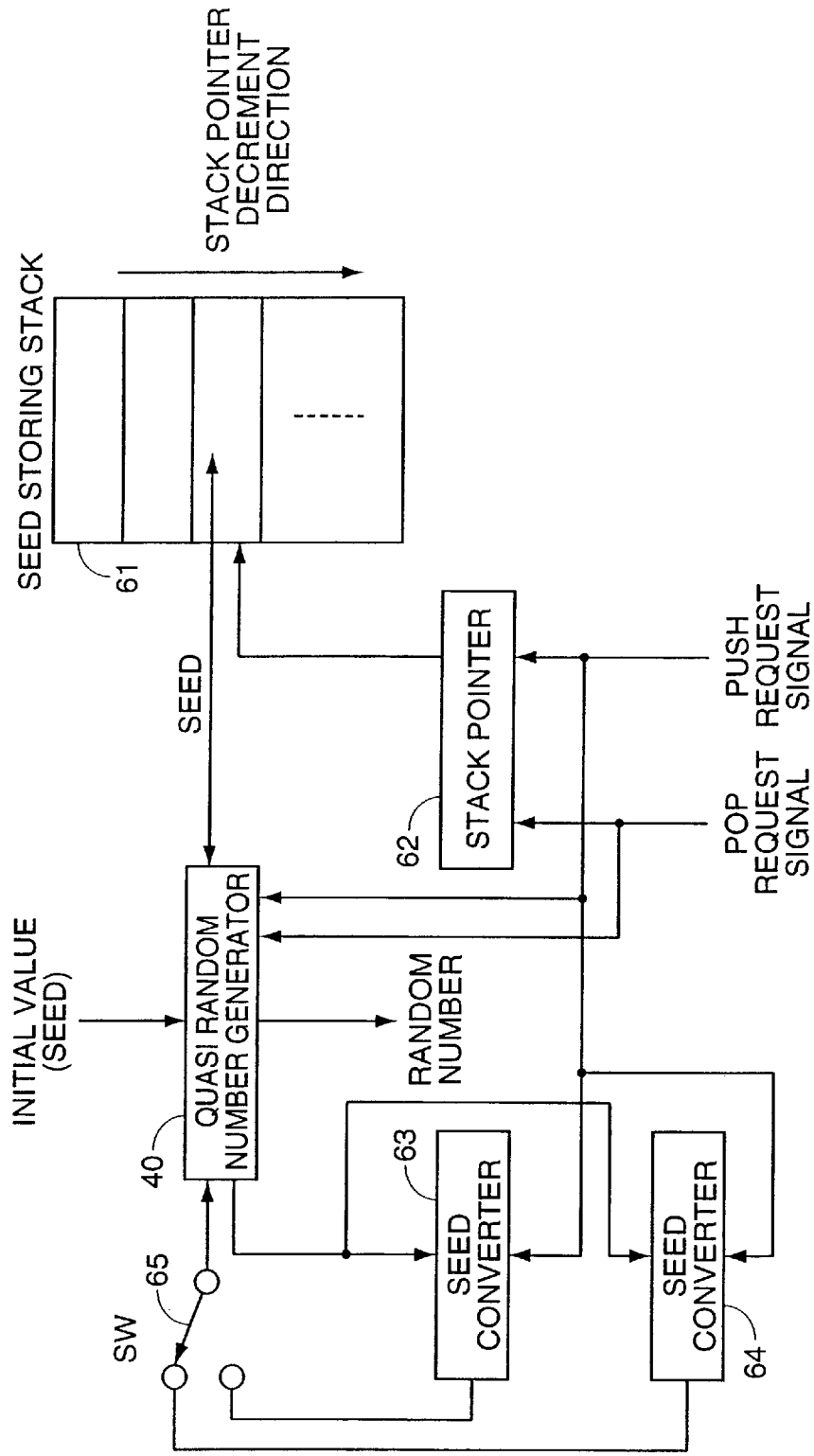
FIG. 19 is a block diagram showing the construction of the quasi random number generator in the embodiment of the image generating apparatus according to the present invention.

FIG. 19 shows an embodiment of the quasi random number generator 142 when plural seed transformation systems are provided and a suitable system is selected from then by a switching circuit.

That is, in addition to the seed transformation unit 63, a seed transformation unit 64 using a different transformation system is provided. When supplied with the push request signal, the seed transformation unit 64 also reads out the current random number seed from the quasi random number generator 40 to subject the read-out current random number seed to alteration processing such as bit rearrangement, for example, and then writes the random number seed after the alteration processing as the current random number seed into the storage unit of the quasi random number generator 40.

In this case, one of the outputs of the seed transformation unit 63 and the seed transformation unit 64 is selected by the switch circuit 65. The switching operation of the switch circuit is performed by the quasi minute drawing information generator 141.

When each node is shifted to a child node in the tree structure shown in FIG. 13, the suitable seed transformation system may be varied in accordance with the algorithm being used for representation of an object. However, according to the embodiment of FIG. 19, the suitable seed transformation can be selected in accordance with any different algorithm. Accordingly, the object representation can be performed with higher quality.

[Construction 5]

Figure 20:
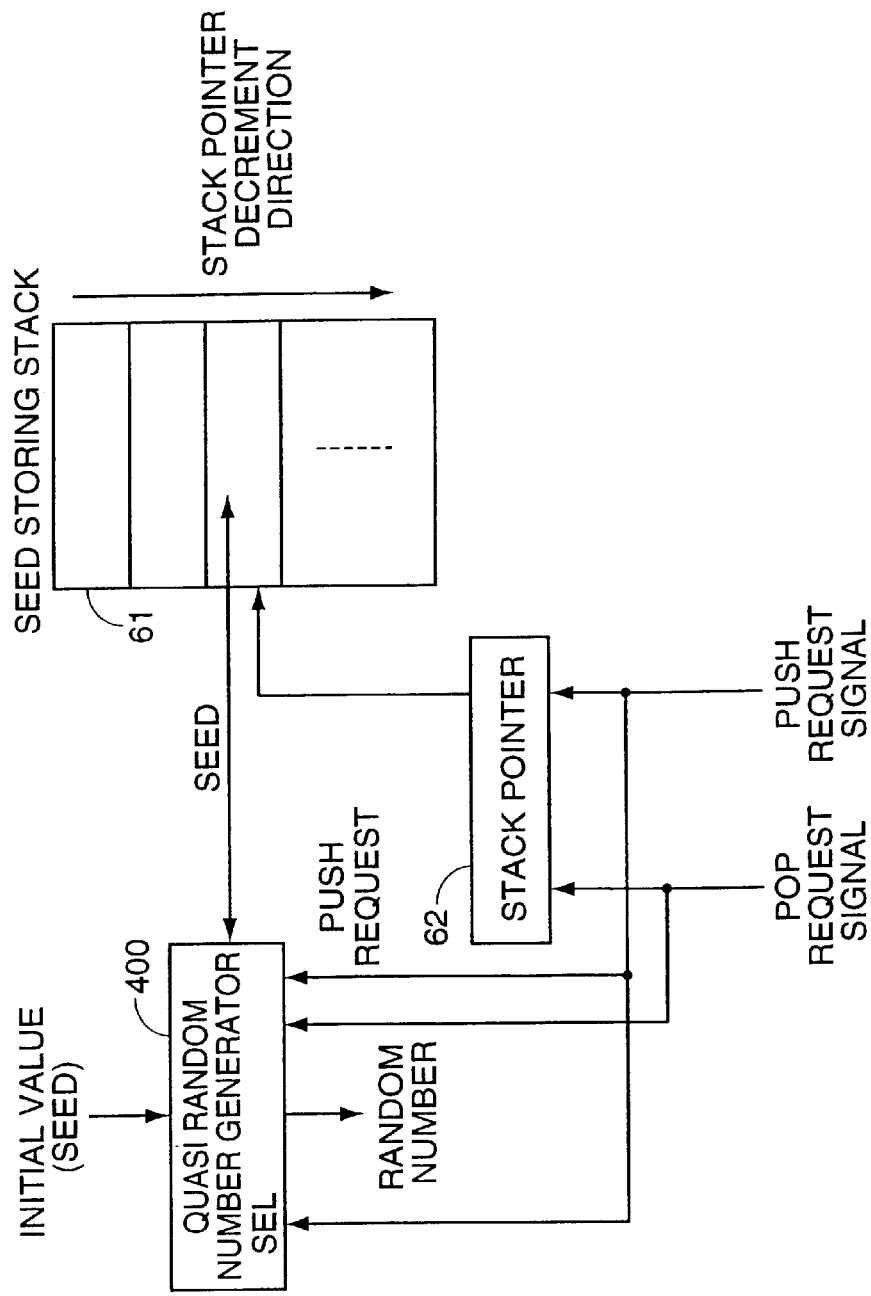
FIG. 20 is a block diagram showing the construction of the quasi random number generator in the embodiment of the image generating apparatus according to the present invention.

In the case of FIG. 20, different random number sequences can be generated without using the seed transformation unit. That is, in a quasi random number generator 400 of this embodiment, one of two random number sequence A and random number sequence B can be selected in accordance with a selection signal input to the selection terminal SEL of the quasi random number generator 400. In this embodiment, the push request signal is supplied to the selection terminal SEL. The push request signal is set to "1" at the request time, and to "0" at the other times. Therefore, the quasi random number generator 400 generates the random numbers of the sequence B at the push request time, and the random numbers of the sequence A at the other times.

Accordingly, when the random number seed of the quasi random number generator 400 is stored into the stack 61, the current random number seed is changed by using a different random number sequence.

In this case, in the above algorithm 3, a new seed is obtained through the transformation for the shift to an child node, and the relation between the random numbers of the parent node and the child node at the left end is set to a correlation based on the random number sequence B. Therefore, the random numbers which are excellent in quality as a whole can be obtained. Therefore, this embodiment is applicable to various algorithms without using plural seed transformation function specifically.

As described above, according to the image generating apparatus of this embodiment, various reproducible shapes can be obtained on the basis of a small data amount by containing the quasi random number generating means which can be initialized and are reproducible.

Further, by generating quasi random numbers which are reproducible to the n-dimensional lattices, the random number sequence of a desired area can be obtained by a small calculation amount.

Still further, quasi random numbers which are highly reproducible to the n-dimensional lattices can be generated by using plural quasi random number generators, and random numbers can be calculated on the basis of a small calculation amount in an area in which a high-quality random number sequence is needed.

In addition, by generating quasi random numbers which are reproducible to the recurrent structure, the random number sequence of a desired area can be calculated by a small calculation amount.

By using the quasi random number generator containing the count function, the random number value which is located ahead in the quasi random number sequence by any number can be calculated, and the calculation for obtaining a reproducible quasi random number for only a partial area.

By adding the stack function for stocking the random number seed to the quasi random number generator, the generation of the random number which has a recurrent structure and is reproducible can be performed with high efficiency.

Further, by adding the function of automatically changing the current random number seed, the generation of the random number which has a recurrent structure and is reproducible can be performed at high speed.

By preparing some systems for changing the random number seed, an alteration operation which is suitable for an algorithm being used can be selected, and the quality of the object representation can be more enhanced.

When the quasi random number generator is provided with a function for generating at least two different and independent random number sequences, random numbers which are excellent in quality as a whole can be obtained, and various algorithms can be applied without having a plurality of special seed transformation functions.

If each of the quasi random number generators 40 of the constructions 2 to 5 is provided with the count function of the construction 1, the random number value which is located ahead by any number can be obtained at high speed by the recurrent algorithm.

In the above embodiments, the present invention is applied to the game machine, however, the present invention is applicable not only to the game machine, but also to various image generating apparatuses for various computer graphics.

As described above, according to the present invention, various reproducible shapes can be obtained by a small amount of data by the image generating apparatus containing the initializable and reproducible quasi random number generating means. Therefore, the image drawing representation method and the processing efficiency can be enhanced.

What is claimed is:

1. An image generating apparatus for generating drawing data on the basis of a polygon drawing command and outputting the drawing data as image data, comprising:

means for receiving the polygon drawing command, the polygon drawing command including polygon information for drawing a reference object representing a rough shape of an object to be drawn, and an initial value given to generate quasi minute drawing information of the object;

quasi random number generating means for generating a reproducible random number value on the basis of the initial value;

quasi minute drawing information generating means for dividing into plural fundamental polygons an object area or a partial area of the object which is represented by the polygon information for drawing the reference object in order to generate the quasi minute drawing information; and drawing means for generating drawing data to draw the object on the basis of the plural fundamental polygons;

wherein said quasi random number generating means is initialized upon input of the initial value thereto, and uses the random number value thus generated as a random number seed to generate a next random number, thereby successively generating random number values and said quasi random number generating means has a stack for storing the random number seed, and a stack pointer for performing a write-in operation into said stack and a read-out operation from said stack.

2. The image generating apparatus as claimed in claim 1, wherein said quasi random number generating means further includes random number seed changing means for changing the current random number seed to another value when the random number seed is written into said stack.

3. The image generating apparatus as claimed in claim 1, wherein said quasi random number generating means further includes plural random number seed changing means each of which changes the random number seed to another value, one of said plural random number seed changing means being selected on the basis of a selection control signal.

4. The image generating apparatus as claimed in claim 1, wherein said quasi random number generating means includes means for generating at least two different and independent random sequences, and means for changing the current random number seed by using a different random number sequence when the random number seed is written into said stack.

5. An image generating apparatus for generating drawing data on the basis of a polygon drawing command and outputting the drawing data as image data, comprising:

means for receiving the polygon drawing command, the polygon drawing command including polygon information for drawing a reference object representing a rough shape of an object to be drawn, and an initial value given to generate quasi minute drawing information of the object;

quasi random number generating means for generating a reproducible random number value on the basis of the initial value;

quasi minute drawing information generating means for dividing into plural fundamental polygons an object area or a partial area of the object which is represented by the polygon information for drawing the reference object in order to generate the quasi minute drawing information; and drawing means for generating drawing data to draw the object on the basis of the plural fundamental polygons;

wherein the polygon drawing command contains a command for generating quasi minute drawing information representing the object more minutely by processing the polygon information.

6. An image generating apparatus for generating drawing data on the basis of a polygon drawing command and outputting the drawing data as image data, comprising:

means for receiving the polygon drawing command, the polygon drawing command including polygon information for drawing a reference object representing a rough shape of an object to be drawn, and an initial value given to generate quasi minute drawing information of the object;

quasi random number generating means for generating a reproducible random number value on the basis of the initial value;

quasi minute drawing information generating means for dividing into plural fundamental polygons an object area or a partial area of the object which is represented by the polygon information for drawing the reference object in order to generate the quasi minute drawing information; and drawing means for generating drawing data to draw the object on the basis of the plural fundamental polygons;

wherein said quasi random number generating means includes plural random number generating means, and said quasi minute drawing information divides into n-dimensional lattices (n represents an integer above 2) an object area or a partial area of the object which is represented by the polygon information for drawing the reference object, supplies a random number obtained at each point on the (i-1)-dimensional lattices as an initial value from one of said plural random number generating means to the other random number generating means of said plural random number generating means in order to obtain random numbers in the i-dimensional lattice direction with the point as a start point, and processes the information at each point in the i-dimensional lattice direction on the basis of the given random number value.

7. An image generating apparatus for generating drawing data on the basis of a polygon drawing command and outputting the drawing data as image data, comprising:

means for receiving the polygon drawing command, the polygon drawing command including polygon information for drawing a reference object representing a rough shape of an object to be drawn, and an initial value given to generate quasi minute drawing information of the object;

quasi random number generating means for generating a reproducible random number value on the basis of the initial value;

quasi minute drawing information generating means for dividing into plural fundamental polygons an object area or a partial area of the object which is represented by the polygon information for drawing the reference object in order to generate the quasi minute drawing information; and drawing means for generating drawing data to draw the object on the basis of the plural fundamental polygons;

wherein when the object is represented by a recurrent structure including plural levels having membership (parent/child relationship), each level comprising plural nodes, said quasi minute drawing information generating means supplies said quasi random number generating means the value obtained by performing a predetermined transformation on a random number obtained at the node for the current state, as an initial value of a random number generated in a child node sequence to said quasi random in the recurrent structure, said quasi random number generating means generates a random number on the child node sequence on the basis of the initial value of the given random number, said quasi random number generating means having a stack for storing random numbers, and saves the random number at the node on said stack in order to generate a reproducible random number value at each node, and reads out the random number value at a parent node when returning from the child node to the parent node; and said quasi minute drawing information generating means processes the information at each node on the basis of the random number value obtained by said quasi minute drawing information generating means.

8. A random number generating apparatus for generating a random number, comprising:

random number generating means for generating a random number in accordance with the given initial value, said random number generating means generating the reproducible random number in accordance with the initial value, the random number value thus generated being set as a value to generate a next random number value; and a counter which can set a preset counter set value, said random number generating means generating random numbers whose number is equal to the set value.

9. A random number generating apparatus for generating a random number comprising:

random number generating means for generating a random number in accordance with a given initial value, said random number generating means generating a reproducible random number in accordance with the initial value, the random number value thus generated being set as a value to generate a next random number value;

a stack for storing the random number seed; and a stack pointer for performing a write-in operation into said stack and a read-out operation from said stack.

10. The random number generating apparatus as claimed in claim 9, further including random number seed changing means for changing the current random number seed to another value when the random number seed is written into said stack.

11. The random number generating apparatus as claimed in claim 9, further including plural random seed changing means each of which changes the random number seed to another value, one of said plural random number seed changing means being selected by a selection control signal.

12. The random number generating apparatus as claimed in claim 9, further including means for generating at least different and independent random number sequences, and means for changing the current random number seed by using a different random number sequence when the random number seed is written into said stack.

* * * * *